(12) United States Patent
Muramatsu et al.

(10) Patent No.: US 11,511,368 B2
(45) Date of Patent: Nov. 29, 2022

(54) ELECTRICALLY CONDUCTIVE TIP MEMBER AND METHOD FOR PRODUCING THE SAME

(71) Applicants: NGK INSULATORS, LTD., Nagoya (JP); TOHOKU UNIVERSITY, Sendai (JP)

(72) Inventors: Naokuni Muramatsu, Nagoya (JP); Takanari Nakajima, Handa (JP); Takashi Goto, Sendai (JP)

(73) Assignee: NGK Insulators, Ltd., Nagoya (JP)

(*) Notice: Subject to any disclaimer, the term of this patent is extended or adjusted under 35 U.S.C. 154(b) by 182 days.

(21) Appl. No.: 16/884,502

(22) Filed: May 27, 2020

(65) Prior Publication Data

US 2020/0316708 A1 Oct. 8, 2020

Related U.S. Application Data

(63) Continuation of application No. PCT/JP2018/043147, filed on Nov. 22, 2018.

(30) Foreign Application Priority Data

Nov. 28, 2017 (JP) .............................. JP2017-227751

(51) Int. Cl.
  *B22F 3/105* (2006.01)
  *B22F 3/14* (2006.01)
  (Continued)

(52) U.S. Cl.
  CPC .......... *B23K 11/3009* (2013.01); *B22F 3/105* (2013.01); *B22F 3/14* (2013.01);
  (Continued)

(58) Field of Classification Search
  CPC .... B22F 3/105; B22F 2003/1051; B22F 3/14; B22F 2301/10
  See application file for complete search history.

(56) References Cited

U.S. PATENT DOCUMENTS

| 5,914,057 A | 6/1999 | Nippert et al. |
| 2015/0255195 A1* | 9/2015 | Muramatsu ............ B22F 3/105 338/20 |
| 2017/0130299 A1 | 5/2017 | Goto et al. |

FOREIGN PATENT DOCUMENTS

| CN | 106661671 A | 5/2017 |
| EP | 3 135 780 A1 | 3/2017 |

(Continued)

OTHER PUBLICATIONS

WO-2012089105-A1 English language translation (Year: 2012).*
Muramatsu, Naokuni, et al. "Development of high-electrical-conductivity and high-wear-resistance hypoeutectic Cu—Zr alloy SPS materials." Funtai Oyobi Fummatsu Yakin/Journal of the Japan Society of Powder and Powder Metallurgy 63.3 (2016): 132-138 (Year: 2016).*

(Continued)

*Primary Examiner* — Anthony J Zimmer
*Assistant Examiner* — Sean P. O'Keefe
(74) *Attorney, Agent, or Firm* — Burr & Brown, PLLC

(57) ABSTRACT

An electrically conductive tip member includes: an inner periphery portion including a Cu matrix phase and a second phase that is dispersed in the Cu matrix phase and contains a Cu—Zr-based compound, the inner periphery portion having an alloy composition of Cu-xZr (where x is the atomic percentage of Zr and satisfies $0.5 \leq x \leq 16.7$); and an outer periphery portion that is present on an outer circumferential side of the inner periphery portion, made of a metal containing Cu, and has higher electrical conductivity than the inner periphery portion.

8 Claims, 32 Drawing Sheets

(51) Int. Cl.
  *B22F 7/06* (2006.01)
  *B23K 11/30* (2006.01)
  *C22C 9/00* (2006.01)
  *B23K 103/04* (2006.01)
  *B23K 35/40* (2006.01)

(52) U.S. Cl.
  CPC .................. *B22F 7/06* (2013.01); *C22C 9/00* (2013.01); *B22F 2301/10* (2013.01); *B23K 35/402* (2013.01); *B23K 2103/04* (2018.08)

(56) References Cited

FOREIGN PATENT DOCUMENTS

| | | |
|---|---|---|
| JP | 2007-260686 A1 | 10/2007 |
| JP | 2009-220168 A1 | 10/2009 |
| JP | 2011-212749 A1 | 10/2011 |
| JP | 2013-027919 A | 2/2013 |
| KR | 10-2000-0070471 A | 11/2000 |
| WO | WO-2012089105 A1 * 7/2012 .............. B22F 3/105 |
| WO | 2016/189929 A1 12/2016 |

OTHER PUBLICATIONS

Korean Office Action (Application No. 10-2020-7015051) dated Feb. 22, 2021 (with English translation).
English translation of the International Preliminary Report on Patentability (Chapter 1) (Application No. PCT/JP2018/043147) dated Jun. 11, 2020.
International Search Report and Written Opinion (Application No. PCT/JP2018/043147) dated Jan. 29, 2019.
Young-Jin Yum, et al., "Mechanical Properties of Cu—TiB$_2$ Nanocomposite by MA/SPS," *Science and Technology*, 2005, KORUS 2005. Proceedings. The 9th Russian-Korean International Symposium on Novosibirsk, Russia, Jun. 26-Jul. 2, 2005, Piscataway, NJ, USA, IEEE, US, Jun. 26, 2005, pp. 568-570.
Extended European Search Report (Application No. 18882669.7) dated Jul. 26, 2021.
Chinese Office Action (Application No. 201880076857.8) dated Sep. 9, 2021 (with English translation).

* cited by examiner

10 μm

10 μm

10 μm

Front side

Back side

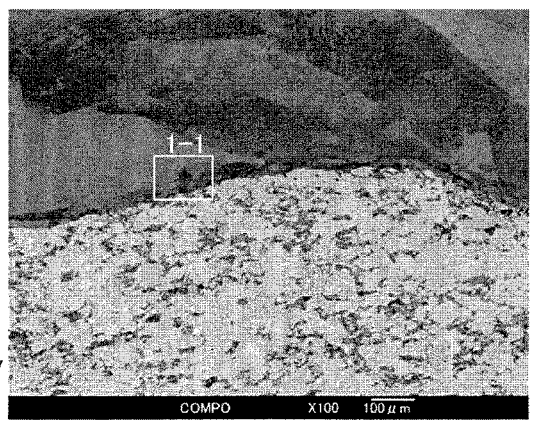
Fig. 8A
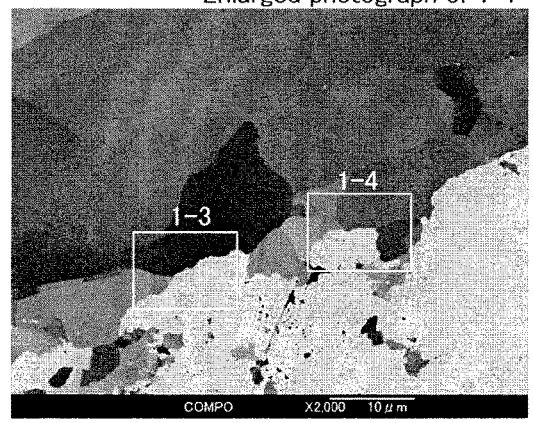
Fig. 8B Enlarged photograph of 1-1
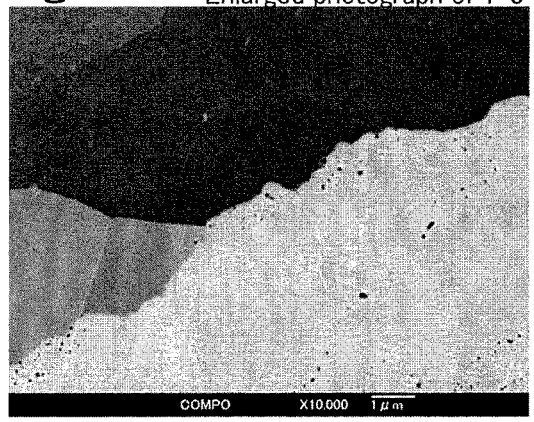
Fig. 8C Enlarged photograph of 1-3
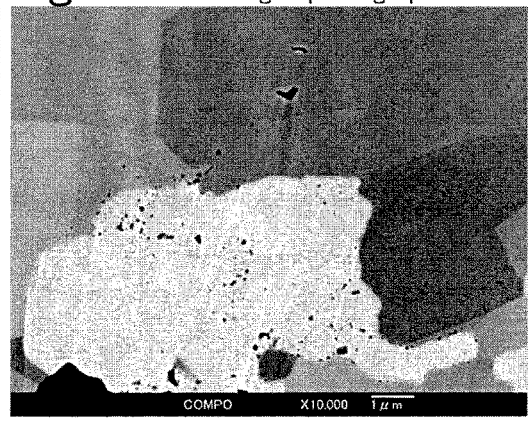
Fig. 8D Enlarged photograph of 1-4

Enlarged SEM photograph of 1-1

Front side

Back side

Enlarged photograph of 2-2

Enlarged photograph of 2-2

Enlarged photograph of 2-3

Enlarged photograph of 2-3

Enlarged photograph of 2-4

Enlarged photograph of 2-4

Enlarged SEM photograph of 2-3

ELECTRICALLY CONDUCTIVE TIP MEMBER AND METHOD FOR PRODUCING THE SAME

BACKGROUND OF THE INVENTION

1. Field of the Invention

The present description discloses an electrically conductive tip member and a method for producing the same.

2. Description of the Related Art

Known conventional electrically conductive tip members used as welding electrodes are used to hold workpieces such as steel or aluminum alloy bodies and cause a large current to flow through the pressed workpieces in a short time in a pressured state to thereby melt and weld their contact interface. For example, in previously proposed welding electrodes, a heat transfer interference portion having lower thermal conductivity than its surrounding area is disposed in a central region of a holding surface of each of the facing electrodes (see, for example, PTL 1). In a previously proposed resistance welding electrode, a tip electrode formed of steel composed mainly of tungsten is embedded in a forward end of a shank (see, for example, PTL 2). It is stated that, with this welding electrode, high-tension coated steel sheets can be resistance-welded.

CITATION LIST

Patent Literature

PTL 1: Japanese Unexamined Patent Application Publication No. 2009-220168
PTL 2: Japanese Unexamined Patent Application Publication No. 2007-260686

SUMMARY OF THE INVENTION

In each of the tip electrodes described in PTL 1 and PTL 2, the electrode body is formed of Cu or a Cu alloy, and the central region is formed of tungsten. Since different metals with different sintering temperatures are used, many steps are necessary to produce the electrode in some cases. Moreover, since each of these tip electrodes is formed using different metals, an interface may be formed between these metals. This has led to the desire for a novel electrically conductive tip member that can be produced using a simple production process and has no interface between its components.

The invention disclosed in the present description has been made in view of the foregoing circumstances, and it is a principal object to provide a novel electrically conductive tip member having higher electrical conductivity and higher strength and a method for producing the electrically conductive tip member.

Extensive studies have been conducted to achieve the principal object, and the present inventors have found that, when a composite member is used which includes metallic copper used as a current-carrying member and a strong structural body containing a Cu—Zr-based compound and disposed on the inner circumferential side of the current-carrying member, a novel electrically conductive tip member having higher electrical conductivity and higher strength and a method for producing the electrically conductive tip member can be provided.

Accordingly, an electrically conductive tip member disclosed in the present description includes:
an inner periphery portion including a Cu matrix phase and a second phase that is dispersed in the Cu matrix phase and contains a Cu—Zr-based compound, the inner periphery portion having an alloy composition of Cu-xZr (where x is the atomic percentage of Zr and satisfies $0.5 \leq x \leq 16.7$); and
an outer periphery portion that is present on an outer circumferential side of the inner periphery portion, made of a metal containing Cu, and has higher electrical conductivity than the inner periphery portion.

An electrically conductive tip member production method disclosed in the present description is a method for producing an electrically conductive tip member including an inner periphery portion and an outer periphery portion that is present on an outer circumferential side of the inner periphery portion and has higher electrical conductivity than the inner periphery portion,
the method including a sintering step of: disposing a raw material of the outer periphery portion, the raw material containing Cu and having higher electrical conductivity than the inner periphery portion; disposing a raw material powder for the inner periphery portion on an inner circumferential side of the raw material of the outer periphery portion, the raw material powder having an alloy composition of Cu-xZr (where x is the atomic percentage of Zr and satisfies $0.5 \leq x \leq 16.7$) obtained using a powder containing Cu and a Cu—Zr master alloy or a powder containing Cu and $ZrH_2$; pressurizing and holding the raw material powder in a prescribed pressure range at a prescribed temperature lower than a eutectic point temperature; and subjecting the raw material powder to spark plasma sintering.

The electrically conductive tip member and the method for producing the same disclosed in the present description can provide a novel product having higher electrical conductivity and also higher strength. The reason for this may be as follows. For example, in this electrically conductive tip member, the outer periphery portion is formed of the metal containing Cu and having high electrical conductivity, and the inner periphery portion is formed of a high-strength material including the Cu matrix phase and the second phase containing the Cu—Zr-based compound. It is therefore inferred that the outer side provides the high electrical conductivity and the inner side provides the high strength and high hardness. Since the outer periphery portion and the inner periphery portion are formed of similar Cu-based materials, an unwanted interface, for example, is unlikely to be formed therebetween, so that problems are less likely to occur than in an electrically conductive tip member having an interface. Generally, in methods for producing such electrically conductive tip members, some metal element powders are highly reactive. For example, Zr powder is highly reactive with oxygen, so that extreme care is required when it is used as a raw material powder in air. However, Cu—Zr master alloy powder (e.g., a Cu-50 mass % Zr master alloy) and $ZrH_2$ powder are relatively stable and can be handled with ease even in air. An inner periphery portion containing the Cu—Zr-based compound can be produced using relatively simple treatment in which any of these raw material powders is subjected to spark plasma sintering. Moreover, since the outer periphery portion and the inner periphery portion are formed of the Cu-based materials, their sintering temperatures do not differ significantly. This is advantageous in that the objective product can be obtained by one spark plasma sintering (SPS) operation.

BRIEF DESCRIPTION OF THE DRAWINGS

FIGS. 8A to 8D show SEM photographs of cross sections of boundary portions between an outer periphery portion and an inner periphery portion in Example 1.

DETAILED DESCRIPTION OF THE INVENTION

Figure 1:
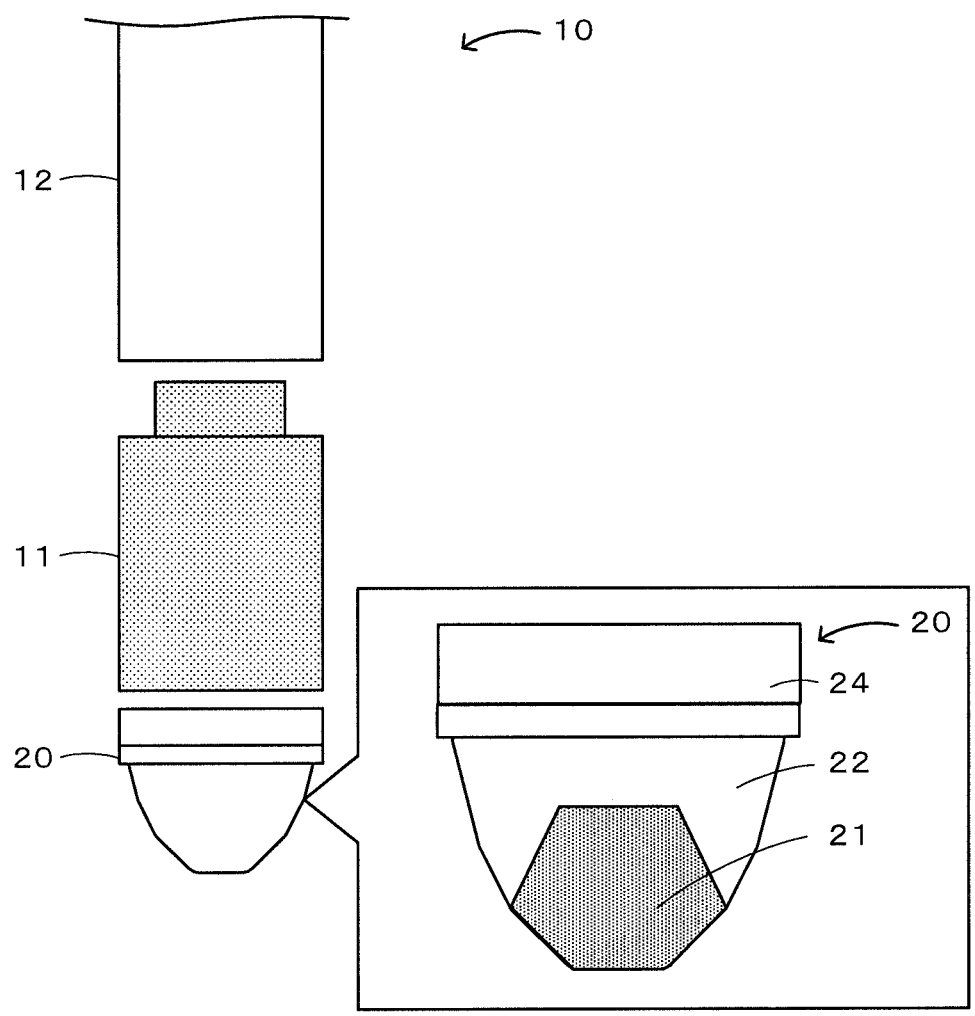
FIG. 1 is an illustration showing an example of a welding arm 10 including a tip electrode 20.

Electrically conductive tip members disclosed in the present description will be described with reference to the drawings. FIG. 1 is an illustration showing an example of a welding arm 10 including a tip electrode 20 that is an example of an electrically conductive tip member in an embodiment. This welding arm 10 is used to weld workpieces such as steel sheets or aluminum alloy sheets and may be used, for example, for spot welding. The welding arm 10 includes: the tip electrode 20 that comes into contact with a workpiece and melts the workpiece; a holder 12 that is disposed in a base portion of a welding robot and receives electricity; and a shank 11 that is interposed between the tip electrode 20 and the holder 12 to supply electric power to the tip electrode 20 and hold the tip electrode 20.

The shank 11 is a member required to have high electrical conductivity, high strength, high hardness, etc. The shank 11 has an unillustrated connection portion to which the tip electrode 20 is connected and an unillustrated attachment portion attached to the holder 12. The shank 11 may be formed of, for example, a Cu—Be—Co-based alloy. The shank 11 may have a hollow shape in which an internal space serving as a coolant channel such as a water cooling pipe is formed. The holder 12 is a member required to have high heat dissipation ability, high strength, high hardness, etc. and may be formed of, for example, a Cu—Ni—Be-based alloy.

The tip electrode 20 is a member required to have electrical conductivity, high thermal stability, and hardness. The tip electrode 20 includes an inner periphery portion 21, an outer periphery portion 22, and a connection portion 24. The connection portion 24 (socket) of the tip electrode 20 is required to have high hardness and may be formed of, for example, a Cu—Be—Co-based alloy.

The inner periphery portion 21 may have higher hardness and mechanical strength (such as tensile strength) than the outer periphery portion 22. The inner periphery portion 21 includes a Cu matrix phase and a second phase dispersed in the Cu matrix phase and containing a Cu—Zr-based compound and has an alloy composition of Cu-xZr (where x is the atomic percentage of Zr and satisfies $0.5 \leq x \leq 16.7$). The inner periphery portion 21 has electrical conductivity and also has high mechanical strength. In the inner periphery portion 21, the Cu matrix phase and the second phase are separated from each other, and the second phase may contain $Cu_5Zr$ as the Cu—Zr-based compound. The inner periphery portion 21 may contain unavoidable components. The inner periphery portion 21 may have a composition obtained by diluting a composition shown in Table 1 such that the content of Zr is from 0.5 at % to 16.7 at % inclusive. $Cu_5Zr$ has a hardness of MHv 585±100 in terms Vickers hardness. In the Cu-xZr alloy composition in the inner periphery portion 21, x is preferably 1.0 or more, more preferably 3.0 or more, and still more preferably 5.0 or more. As x increases, i.e., the amount of Zr increases, the mechanical strength, the hardness, etc. are further improved, and this is preferable. x may be 15.2 or less and may be 8.6 or less. Preferably, the inner periphery portion 21 has at least one of the following features (1) to (4).

(1) The average particle size D50 of the second phase in a cross section is in the range of 1 μm to 100 μm.

(2) The second phase includes a Cu—Zr-based compound phase in an outer shell and a Zr phase in a core, the Zr phase containing a larger amount of Zr than the outer shell.

(3) The Cu—Zr-based compound phase serving as the outer shell has a thickness of 40% to 60% of a particle radius that is the distance between a particle outermost circumference and a particle center.

(4) The Cu—Zr-based compound phase serving as the outer shell has a hardness of MHv 585±100 in terms of Vickers hardness, and the Zr phase serving as the core has a hardness of MHv 310±100 in terms of Vickers hardness.

TABLE 1

| Component | Content (% by mass) |
| --- | --- |
| Zr | 47.0-49.9 |
| Be | <0.01 |
| Mg | <0.1 |
| Al | <0.01 |
| Si | <0.03 |
| P | <0.01 |
| Ti | <0.1 |
| Cr | <0.1 |
| Mn | <0.1 |
| Fe | <0.05 |
| Co | <0.1 |
| Ni | <0.1 |
| Zn | <0.1 |
| Sn | <0.01 |
| Pb | <0.1 |
| Nb | <0.1 |
| Hf | <0.5 |
| sub-total | <0.7 |
| Cu | bal. |

The Cu matrix phase is a phase containing Cu and may be a phase containing, for example, α-Cu. The Cu phase can increase the electrical conductivity and can also increase workability. The Cu phase contains no eutectic phase. The eutectic phase is a phase containing, for example, Cu and the Cu—Zr-based compound. The average particle diameter D50 of the second phase is determined as follows. First, a scanning electron microscope (SEM) is used to observe a backscattered electron image of a cross section of a sample at 100× to 500×, and the diameters of inscribed circles of particles contained in the image are determined and used as the diameters of the particles. The diameters of all particles present in the viewing area are determined. This procedure is repeated for a plurality of viewing areas (for example, 5 viewing areas). The particle diameters obtained are used to determine a cumulative distribution, and its median diameter is used as the average particle diameter D50. In the inner periphery portion 21, it is preferable that the Cu—Zr-based compound phase contains $Cu_5Zr$. The Cu—Zr-based compound phase may be a single phase or a phase containing two or more Cu—Zr-based compounds. For example, the Cu—Zr-based compound phase may be a single $Cu_{51}Zr_{14}$ phase, a single $Cu_9Zr_2$ phase, a single $Cu_5Zr$ phase, or a single $Cu_8Zr_3$ phase, may include a $Cu_5Zr$ phase as a main phase and another Cu—Zr-based compound ($Cu_{51}Zr_{14}$, $Cu_9Zr_2$, or $Cu_8Zr_3$) as a subphase, or may include a $Cu_9Zr_2$ phase as a main phase and another Cu—Zr-based compound ($Cu_{51}Zr_{14}$, $Cu_5Zr$, or $Cu_8Zr_3$) as a subphase. The main phase is one of the Cu—Zr-based compound phases that has the highest presence ratio (volume ratio or area ratio in the observation region), and the subphase is the Cu—Zr-based compound phase other than the main phase. Each Cu—Zr-based compound phase has, for example, a high Young's modulus and a high hardness, so that the presence of the Cu—Zr-based compound phase can further increase the mechanical strength of the tip electrode 20. In the inner periphery portion 21, the Zr phase included in the second phase may contain Zr in an amount of, for example, 90 at % or more, 92 at % or more, or 94 at % or more. In the second phase, an oxide film may be formed as the outermost shell. The presence of the oxide film may prevent diffusion of Cu into the second phase. In the core of the second phase, many constricted fine particles may form twins. These fine particles may be the Zr phase, and the phase formed in the constrictions may be the Cu—Zr-based compound phase. It is inferred that such a structure can further increase, for example, the electrical conductivity and can also further increase the mechanical strength. The inner periphery portion 21 may be formed by subjecting a copper powder and a Cu—Zr master alloy or the copper powder and a $ZrH_2$ powder to spark plasma sintering. The spark plasma sintering will be described later in detail. A hypo-eutectic composition may be a composition containing Zr in an amount of from 0.5 at % to 8.6 at % inclusive with the balance being Cu.

The inner periphery portion 21 is preferably electrically conductive and has an electrical conductivity of, for example, preferably 20% IACS or more, more preferably 30% IACS or more, and still more preferably 40% IACS or more. Preferably, the electrical conductivity is determined by the size and shape of the inner periphery portion 21 and the design of current concentration accuracy. In the inner periphery portion 21, the hardness of the Cu—Zr-based compound in the second phase is preferably 300 MHv or more, more preferably 500 MHv or more, and still more preferably 600 MHv or more in terms of Vickers hardness. The ratio of the radius of the inner periphery portion 21 to the radius of the outer periphery portion 22 (the length ratio of the radius of the inner periphery portion 21 to the entire radius) may be 1:1 to 3:1. The inner periphery portion 21 and the outer periphery portion 22 may be joined together by diffusion of Cu during sintering.

The outer periphery portion 22 is present on the outer circumferential side of the inner periphery portion 21 and has higher electrical conductivity than the inner periphery portion. The outer periphery portion 22 is formed of a metal containing Cu. The metal containing Cu may be, for example, metallic Cu, CuW, $Al_2O_3$—Cu (alumina-dispersed copper), a Cu—Cr-based alloy, or a Cu—Cr—Zr-based alloy and is preferably Cu. The outer periphery portion 22 may contain unavoidable components (such as a trace amount of oxygen). The content of oxygen is, for example, preferably 700 ppm or less and may be 200 ppm to 700 ppm. Examples of the unavoidable components include Be, Mg, Al, Si, P, Ti, Cr, Mn, Fe, Co, Ni, Zn, Sn, Pb, Nb, and Hf (see Table 1). These unavoidable components may be contained in an amount of 0.01% by mass or less with respect to the total mass. The electrical conductivity of the outer periphery portion 22 is preferably as high as possible and is preferably 60% IACS or more, more preferably 70% IACS or more, and still more preferably 80% IACS or more. The electrical conductivity is determined as follows. The volume resistivity of a copper alloy is measured according to JIS-H0505, and the ratio of the measured volume resistivity to the resistance value of annealed pure copper (0.017241 μΩm) is computed to convert the measured volume resistivity to the electrical conductivity (% IACS). The outer periphery portion 22 may have a hardness of about 50 to about 80 MHv in terms of Vickers hardness. The outer periphery portion 22 may have higher thermal conductivity than the inner periphery portion 21. The outer periphery portion 22 may have a circular cylindrical outer shape, an elliptical cylindrical outer shape, or a polygonal prismatic outer shape (including rectangular and hexagonal prismatic outer shapes). The inner periphery portion 21 may be located at the center of the tip electrode 20 or at a position displaced from the center.

In the tip electrode 20, it is preferable that the inner periphery portion and the outer periphery portion are in intimate contact with each other through a diffusion layer. In the tip electrode 20, it is more preferable that, between the inner periphery portion and the outer periphery portion, no interface such as a reaction layer that has a crystal structure different from those of the inner and outer periphery portions and blocks the flow of current is present. The diffusion layer is, for example, a layer which is present between the inner periphery portion and the outer periphery portion and in which the ratio of the Cu compound phase to the Cu phase is inclined to a tendency to decrease from the inner periphery portion side toward the outer periphery portion.

Figure 2A:
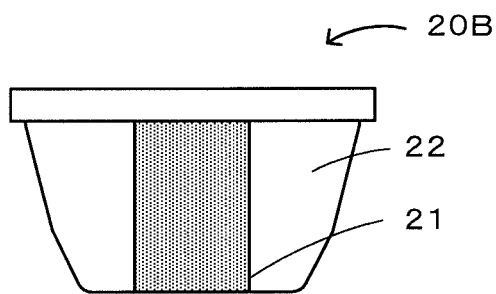
FIGS. 2A and 2B show illustrations of other tip electrodes 20B and 20C.
Figure 2B:
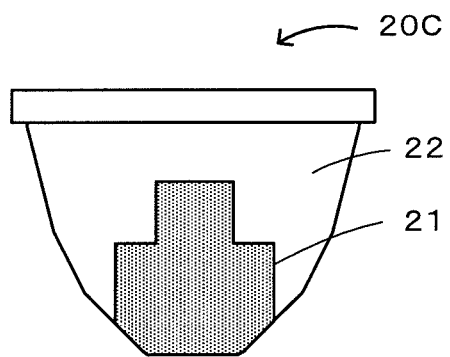

No particular limitation is imposed on the shape of the tip electrode 20. For example, the tip electrode 20 may have a circular cylindrical outer shape, an elliptical cylindrical outer shape, or a polygonal prismatic outer shape (including rectangular and hexagonal prismatic outer shapes). The tip electrode 20 may have any shape suitable for its intended use etc. As shown in FIG. 1, the tip electrode 20 may be formed such that a central region of the inner periphery portion 21 protrudes forward from the outer periphery portion 22. As shown in a tip electrode 20B in FIG. 2A, its forward end may be a flat surface formed from the inner periphery portion 21 and the outer periphery portion 22. As shown in the tip electrode 20B, the inner periphery portion 21 may have a shape extending to the connection portion 24. As shown in a tip electrode 20C in FIG. 2B, the inner periphery portion 21 may have a shape with a step inside the outer periphery portion 22. Alternatively, the tip electrode 20 may have an intermediate portion disposed between the inner periphery portion 21 and the outer periphery portion 22 and having properties intermediate between those of them, and the electrical conductivity, mechanical strength, hardness, etc. may change stepwise or gradually from the center toward the outer circumference.

Next, a method for producing the electrically conductive tip member in the present embodiment will be described. This production method is a method for producing an electrically conductive tip member including an inner periphery portion and an outer periphery portion present on the outer circumferential side of the inner periphery portion and having higher electrical conductivity than the inner periphery portion. The production method may include (a) a pulverization step of obtaining a powder mixture of raw materials and (b) a sintering step of subjecting the raw material powder to spark plasma sintering (SPS). The powder may be prepared separately, and the pulverization step may be omitted.

(a) Pulverization Step

In this step, a copper powder and a Cu—Zr master alloy or the copper powder and a $ZrH_2$ powder are weighed so as to give an alloy composition of Cu-xZr (where x is the atomic percentage (hereinafter abbreviated as at %) of Zr and satisfies $0.5 \leq x \leq 16.7$) and pulverized and mixed in an inert atmosphere until the average particle diameter D50 falls within the range of from 1 μm to 500 μm inclusive to thereby obtain a powder mixture. In this step, the raw materials (the copper powder and the Cu—Zr master alloy or the copper powder and the $ZrH_2$ powder) may be weighed to give an alloy composition of Cu-xZr (0.5 at %$\leq x \leq$16.7 at %). The powder mixture may be prepared so as to have one of a hypo-eutectic composition (0.5 at %$\leq x \leq$8.6 at %), a eutectic composition (x=8.6 at %), and a hyper-eutectic composition (8.6 at %$< x \leq$16.7). The copper powder has an average particle diameter of, for example, preferably 180 μm or less, more preferably 75 μm or less, and still more preferably 5 μm or less. The average particle diameter is a D50 particle diameter measured using a laser diffraction particle size distribution analyzer. The copper powder is preferably composed of copper and unavoidable components and is more preferably oxygen-free copper (JIS C1020). Examples of the unavoidable components include Be, Mg, Al, Si, P, Ti, Cr, Mn, Fe, Co, Ni, Zn, Sn, Pb, Nb, and Hf. The unavoidable components may be contained in an amount of 0.01% by mass or less with respect to the total mass. Preferably, in this step, a Cu—Zr master alloy containing 50% by mass of Cu is used as the raw material of Zr. This Cu—Zr alloy is preferable because it is relatively chemically stable and has good workability. The Cu—Zr master alloy may be in the form of an ingot or metal pieces but is preferably in the form of a fine metal powder because the pulverization and mixing can be easily performed. The Cu—Zr alloy has an average particle diameter of, for example, preferably 250 μm or less and more preferably 20 μm or less. In this step, it is preferable to use a eutectic $ZrH_2$ powder as the raw material of Zr. This $ZrH_2$ powder is preferable because it is relatively chemically stable and has good workability in the atmosphere. The $ZrH_2$ powder has an average particle diameter of, for example, preferably 10 μm or less and more preferably 5 μm or less.

In this step, the raw materials are mixed so as to give an alloy composition of Cu-xZr (0.5 at %$\leq x \leq$16.7 at %). For example, x may be within the range of 8.6 at %$\leq x \leq$16.7 at %, 8.6 at %$\leq x \leq$15.2 at %, 15.2 at %$\leq x \leq$16.7 at %, or 5.0 at %$\leq x \leq$8.6 at %. As the content of Zr increases, the mechanical strength tends to increase. The alloy composition may be such that x is within the range of 0.5 at %$\leq x \leq$5.0 at %. As the content of Cu increases, the electrical conductivity tends to increase. Specifically, in this step, the raw materials are mixed so as to give an alloy composition of $Cu_{1-x}Zr_x$ (0.005$\leq X \leq$0.167), but X may be within the range of, for example, 0.05$\leq x \leq$0.086. The alloy composition may be such that X is within the range of 0.05$\leq x \leq$0.167. In this step, the copper powder, the Cu—Zr master alloy or the $ZrH_2$ powder, and a grinding medium may be sealed in a sealed container and then mixed and pulverized. In this step, it is preferable that the raw materials are mixed and pulverized using, for example, a ball mill. Examples of the grinding medium include, but not particularly limited to, agate ($SiO_2$), alumina ($Al_2O_3$), silicon nitride (SiC), zirconia ($ZrO_2$), stainless steel (Fe—Cr—Ni), chromium steel (Fe—Cr), and cemented carbide (WC—Co). From the viewpoint of high hardness, high specific gravity, and prevention of contamination with foreign matter, Zr balls are used preferably. The atmosphere inside the sealed container is, for example, an inert atmosphere such as a nitrogen, He, or Ar atmosphere. The time of the mixing and pulverizing treatment may be empirically determined such that the average particle diameter D50 falls within the range of from 1 μm to 500 μm inclusive. The treatment time may be, for example, 12 hours or longer or 24 hours or longer. The average particle diameter D50 of the powder mixture is preferably within the range of 100 μm or less, more preferably 50 μm or less, and still more preferably 20 μm or less. The smaller the particle diameter of the powder mixture subjected to the mixing and pulverization, the better, because a uniform copper alloy can be obtained. The powder mixture obtained by the mixing and pulverization may contain, for example, Cu powder and Zr powder or may contain Cu—Zr alloy powder. At least part of the powder mixture obtained by the mixing and pulverization may be alloyed, for example, during the mixing and pulverization.

(b) Sintering Step

In this step, the raw material of the outer periphery portion is disposed, and the raw material powder mixture for the inner periphery portion is disposed on the inner circumferential side of the raw material of the outer periphery portion. They are held and pressurized at a prescribed temperature lower than the eutectic point temperature within a prescribed pressure range to thereby subject the powder mixture to spark plasma sintering. Alternatively, the raw material of an intermediate portion having properties intermediate between those of the inner and outer periphery portions may be disposed therebetween and then sintered. In step (b), the raw materials may be inserted into a graphite-made die and subjected to spark plasma sintering in a vacuum. The raw material of the outer periphery portion may be a powder, a compact (tubular body), or a sintered body but is preferably a powder. This is because this powder can be sintered together with the powder for the inner periphery portion. The raw material of the outer periphery portion may be a powder of metallic Cu, CuW, $Al_2O_3$—Cu (alumina-dispersed copper), a Cu—Cr-based alloy, or a Cu—Cr—Zr-based alloy. When powders are used for the inner periphery portion and the outer periphery portion, for example, the powder for the inner periphery portion is charged into a space inside a partition having the shape of the inner periphery portion, and the raw material powder for the outer periphery portion is charged into a space outside the partition. Then the partition is removed, and the powders are subjected to SPS sintering treatment. The raw material of the inner periphery portion is a powder obtained in the pulverization step and having an alloy composition of Cu-xZr (0.5 at %≤x≤16.7 at %). In this step, the raw material powder may be disposed such that a central region of the inner periphery portion to be formed protrudes from the outer periphery portion and then sintered. In this manner, the tip electrode 20 having a shape with a protruding forward end shown in FIG. 1 can be obtained.

The vacuum condition during sintering may be, for example, 200 Pa or less, 100 Pa or less, or 1 Pa or less. In this step, the spark plasma sintering may be performed at a temperature lower by 400° C. to 5° C. than the eutectic point temperature (e.g., 600° C. to 950° C.). The spark plasma sintering may be performed at a temperature lower by 272° C. to 12° C. than the eutectic point temperature. The spark plasma sintering may be performed at a temperature of 0.9 Tm° C. or lower (Tm(° C.) is the melting point of the alloy powder). The pressurizing condition for the raw materials may be within the range of from 10 MPa to 100 MPa inclusive or 60 MPa or less. This allows a dense copper alloy to be obtained. The holding time under pressurization is preferably 5 minutes or longer, more preferably 10 minutes or longer, and still more preferably 15 minutes or longer. The holding time under pressurization is preferably within the range of 100 minutes or shorter. As for the discharge plasma conditions, it is preferable that, for example, a DC current of from 500 A to 5000 A inclusive is caused to flow between the die and a base plate.

The electrically conductive tip member (the tip electrode 20) and the method for producing the same described in detail in the above embodiments can provide a novel product having higher electrical conductivity and higher strength. The reason for this may be as follows. For example, in this electrically conductive tip member, the outer periphery portion is formed of the metal containing Cu and having high electrical conductivity, and the inner periphery portion is formed of a high-strength material including the Cu matrix phase and the second phase containing the Cu—Zr-based compound. It is therefore inferred that the outer side provides the high electrical conductivity and the inner side provides the high strength and high hardness. Since the outer periphery portion and the inner periphery portion are formed of similar Cu-based materials, an unwanted interface, for example, is unlikely to be formed therebetween, so that problems are less likely to occur than in an electrically conductive tip member having an interface. Generally, in methods for producing such electrically conductive tip members, some metal element powders are highly reactive. For example, Zr powder is highly reactive with oxygen, so that extreme care is required when it is used as a raw material powder in air. However, Cu—Zr master alloy powder (e.g., a Cu-50 mass % Zr master alloy) and $ZrH_2$ powder are relatively stable and can be handled with ease even in air. An inner periphery portion containing the Cu—Zr-based compound can be produced using relatively simple treatment in which any of these raw material powders is subjected to spark plasma sintering. Moreover, since the outer periphery portion and the inner periphery portion are formed of the Cu-based materials, their sintering temperatures do not differ significantly. This is advantageous in that the objective product can be obtained by one spark plasma sintering (SPS) operation.

The electrically conductive tip member of the present disclosure and the method for producing the same are not limited to the embodiments described above. It will be appreciated that the electrically conductive tip member and the method for producing the same can be embodied in various forms so long as they fall within the technical scope of the disclosure.

For example, in the above embodiments, the shank 11 serving as an electrically conductive support member is formed of the Cu—Ni—Be-based alloy, but this is not a limitation. For example, the shank 11 may include an outer periphery portion similar to the inner periphery portion of the tip electrode and an inner periphery portion similar to the outer periphery portion of the tip electrode.

Specifically, the electrically conductive support member may include: an outer periphery portion that includes a Cu matrix phase and a second phase dispersed in the Cu matrix phase and containing a Cu—Zr-based compound and has an alloy composition of Cu-xZr (where x is the atomic percentage of Zr and satisfies 0.5≤x≤16.7); and an inner periphery portion that is present on the inner circumferential side of the outer periphery portion, formed of a metal containing Cu, and has higher electrical conductivity than the outer periphery portion. In this case, the tip electrode and the shank can be formed from the same materials.

EXAMPLES

Hereinafter, examples in which electrically conductive tip members were actually produced will be described as Examples. First, the details of studies on the characteristics of Cu—Zr-based materials for the inner periphery portion will be described as Experimental Examples. Experimental Examples 3-1 to 3-3 and 4-1 to 4-3 correspond to Examples, and Experimental Examples 1-1 to 1-3 and 2-1 to 2-3 correspond to Reference Examples.

Experimental Examples 1 (1-1 to 1-3)

Cu—Zr-based alloy powders produced by a high-pressure Ar gas atomizing method for pulverization were used. The average particle diameters D50 of these alloy powders were 20 to 28 µm. The contents of Zr in the Cu—Zr-based alloy powders were 1 at %, 3 at %, and 5 at %, and the Cu—Zr-based alloy powders were used as alloy powders in Experimental Examples 1-1 to 1-3. The particle size of each alloy powder was measured using a laser diffraction particle size distribution analyzer (SALD-3000J) manufactured by Shimadzu Corporation. The content of oxygen in each powder was 0.100% by mass. The SPS (spark plasma sintering) in the sintering step was performed using a spark plasma sintering apparatus (Model: SPS-210LX) manufactured by SPS SYNTEX INC. 40 g of one of the powders was placed in a graphite-made die having a cavity with a diameter of 20 mm×10 mm. A DC pulse current of 3 kA to 4 kA was applied, and a copper alloy (SPS material) in one of Experimental Examples 1-1 to 1-3 was thereby produced under the conditions of a heating-up rate of 0.4 K/s, a sintering temperature of 1173K (about 0.9 Tm: Tm is the melting point of the alloy), a holding time of 15 minutes, and an applied pressure of 30 MPa. The copper alloys produced using this method are collectively referred to as "Experimental Examples 1."

Experimental Examples 2 (2-1 to 2-3)

A commercial Cu powder (average particle diameter D50=33 µm) and a commercial Zr powder (average particle diameter D50=8 µm) were used and mixed such that the content of Zr in a Cu—Zr-based alloy powder was 1 at %, 3 at %, or 5 at %, and an alloy powder in one of Experimental Examples 2-1 to 2-3 was thereby obtained. The alloy powders were subjected to CIP forming under the conditions of 20° C. and 200 MPa and then subjected to the same process as in Experimental Examples 1, and the copper alloys obtained were used as Experimental Examples 2 (2-1 to 2-3). In Experimental Examples 2, the entire process was performed in an Ar atmosphere.

Experimental Examples 3 (3-1 to 3-3)

A commercial Cu powder (average particle diameter D50=1 μm) and a commercial Cu-50 mass % Zr alloy were used and pulverized for 24 hours in a ball mill using Zr balls. The average particle diameter D50 of the powder obtained was 18.7 μm. The Cu powder and the Cu-50 mass % Zr alloy were mixed such that the content of Zr in the Cu—Zr-based alloy powder was 1 at %, 3 at %, or 5 at %, and the alloy powder obtained was used as an alloy powder in one of Experimental Examples 3-1 to 3-3. These powders were subjected to the same process as in Experimental Examples 1, and the copper alloys obtained were used as Experimental Examples 3 (3-1 to 3-3).

Experimental Examples 4 (4-1 to 4-3)

A commercial Cu powder (average particle diameter D50=1 μm) and a commercial $ZrH_2$ powder (average particle diameter D50=5 μm) were mixed and pulverized for 4 hours in a ball mill using Zr balls. The powder prepared such that the content of Zr in the Cu—Zr-based alloy powder was 1 at %, 3 at %, or 5 at % was used as an alloy powder in one of Experimental Examples 4-1 to 4-3. These powders were subjected to the same process as in Experimental Examples 1, and the copper alloys obtained were used as Experimental Examples 4 (4-1 to 4-3).

(Observations of Microstructures)

Microstructures were observed using a scanning electron microscope (SEM), a scanning transmission electron microscope (STEM), and a nano-beam electron diffraction (NBD) method. In the SEM observation, S-5500 manufactured by Hitachi High-Technologies Corporation was used, and secondary electron images and backscattered electron images were taken at an acceleration voltage of 2.0 kV. In the TEM observation, JEM-2100F manufactured by JEOL Ltd. was used, and BF-STEM images and HAADF-STEM images were taken at an acceleration voltage of 200 kV, and nano-beam electron diffraction was performed. Elementary analysis using an EDX (JED-2300T manufactured by JEOL Ltd.) was performed as appropriate. Measurement samples were prepared by ion milling using an SM-09010 cross-section polisher (CP) manufactured by JEOL Ltd. and using argon as an ion source at an acceleration voltage of 5.5 kV.

(Evaluation of Electrical Properties)

The electrical properties of the SPS materials obtained in the Experimental Examples were examined at room temperature by probe-type electrical conductivity measurement and electrical resistance measurement using a four-terminal method at a length of 500 mm. As for the electrical conductivity, the volume resistivity of each copper alloy was measured according to JIS H0505, and the ratio of the measured volume resistivity to the resistance value of annealed pure copper (0.017241 μΩm) was computed to convert the measured volume resistivity to the electrical conductivity (% IACS). The following formula was used for the conversion. Electrical conductivity γ (% IACS)=0.017241/volume resistivity ρ×100

(Evaluation of Characteristics of Cu—Zr-Based Compound Phases)

For each of the Cu—Zr-based compound phases included in the copper alloys in Experimental Examples 3, the Young's modulus E and the hardness H by the nanoindentation method were measured. The measurement device used was a Nano Indenter XP/DCM manufactured by Agilent Technologies. The indenter head used was XP, and the indenter used was a diamond-made Berkovich indenter. The analysis software used was Test Works 4 from Agilent Technologies. As for the measurement conditions, the measurement mode was a CSM (Continuous Stiffness Measurement) mode at an excitation oscillation frequency of 45 Hz, an excitation oscillation amplitude of 2 nm, a strain rate of 0.05 $s^{-1}$, an indentation depth of 1000 nm, and a measurement temperature of 23° C. The number of measurement points N was 5, and the intervals between the measurement points were 5 μm. Fused silica was used as a standard sample. Each of the samples was subjected to cross-section processing using a cross-section polisher (CP). Using a hot-melt adhesive, the sample was fixed to a sample stage by heating the sample and the sample stage at 100° C. for 30 seconds. The sample stage and the sample were attached to the measurement device to measure the Young's modulus E of the Cu—Zr-based compound phase and its hardness H by the nanoindentation method. In this case, the measurement was performed at five points, and average values were used as the Young's modulus E and the hardness H by the nanoindentation method.

(Discussion on Materials Forming Inner Periphery Portions)

Figure 3A:
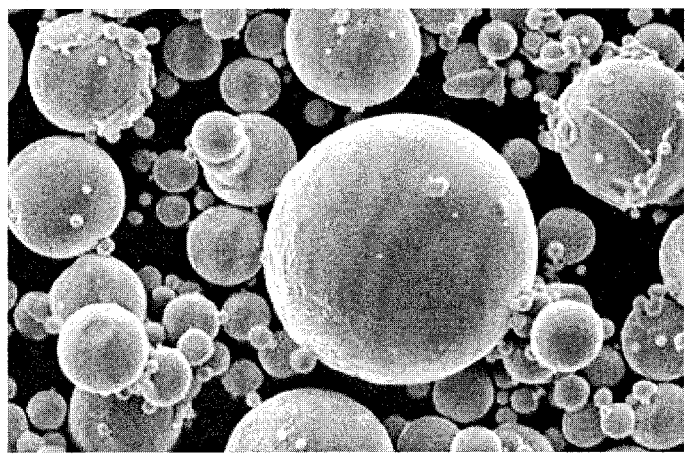
FIGS. 3A to 3C show SEM images of raw material powders in Experimental Examples 1-3, 3-3, and 4-3.
Figure 3B:
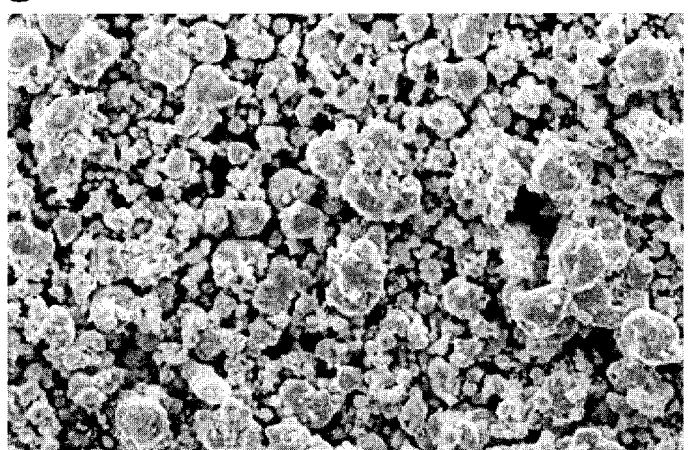
Figure 3C:
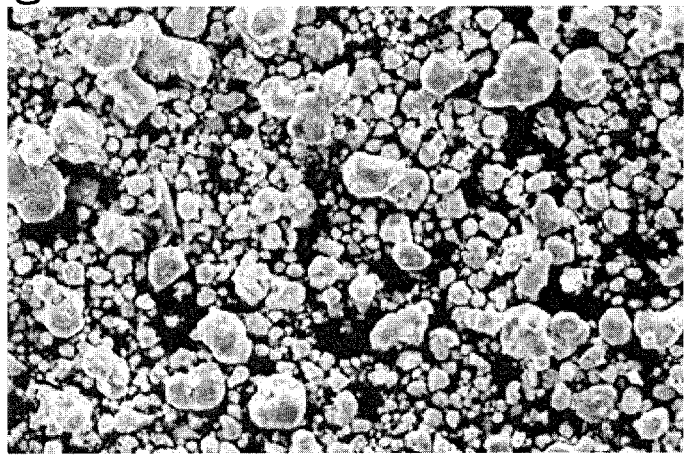
Figure 4:
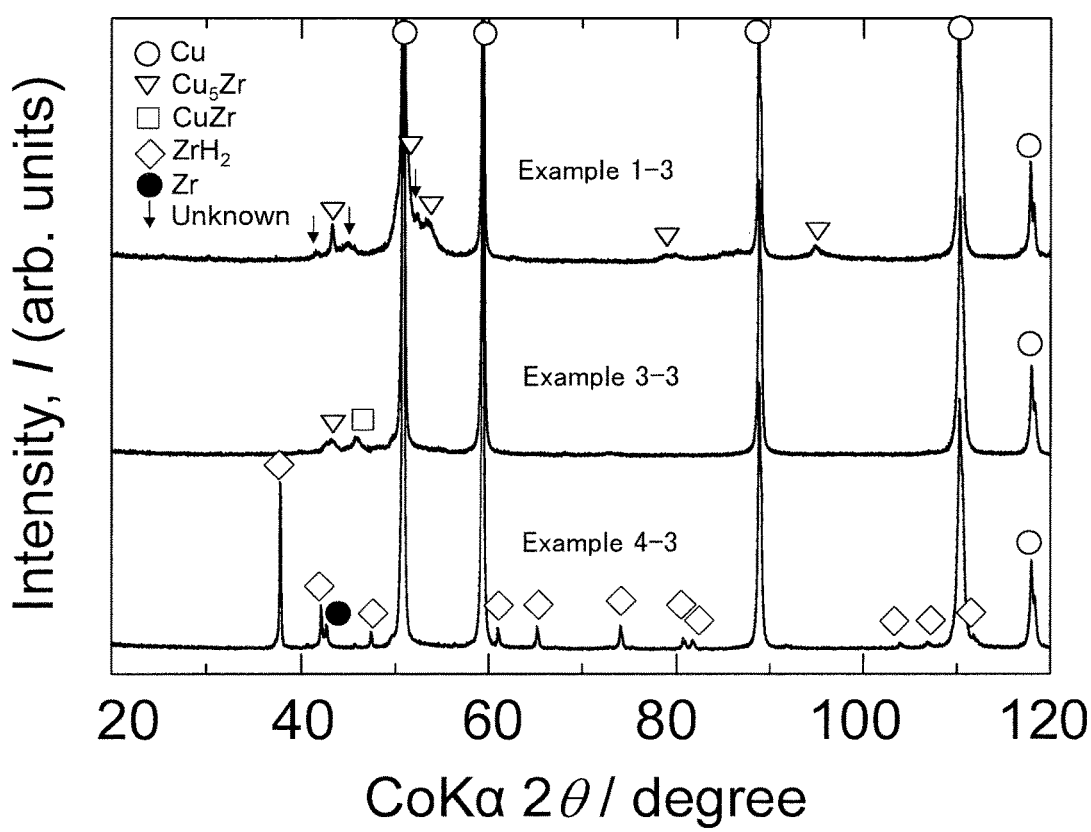
FIG. 4 shows the results of X-ray diffraction measurement for raw material powders in Experimental Examples 1-3, 3-3, and 4-3.
Figure 5A:
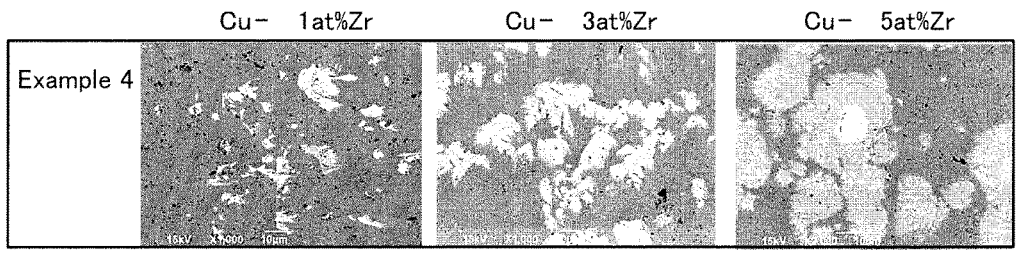
FIGS. 5A to 5D show SEM-BE images of cross sections in Experimental Examples 1 to 4.
Figure 5B:
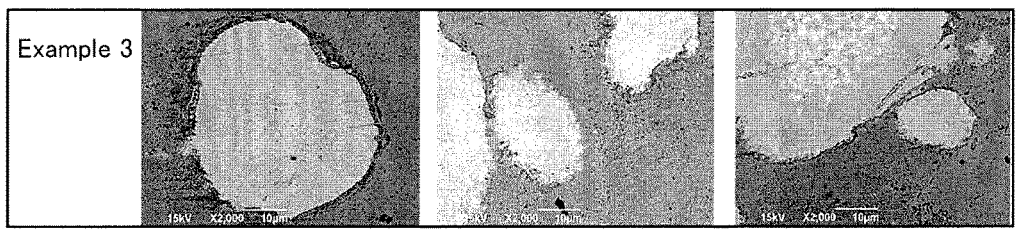
Figure 5C:
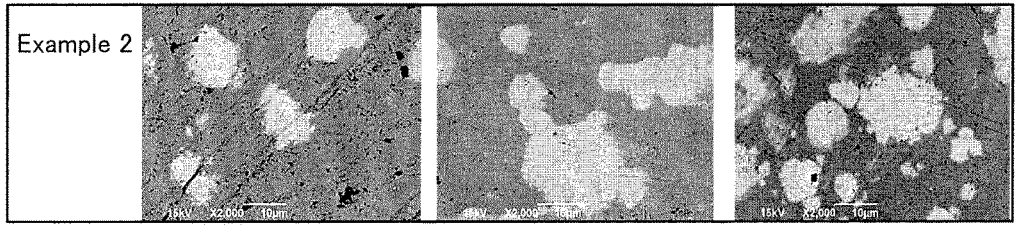
Figure 5D:
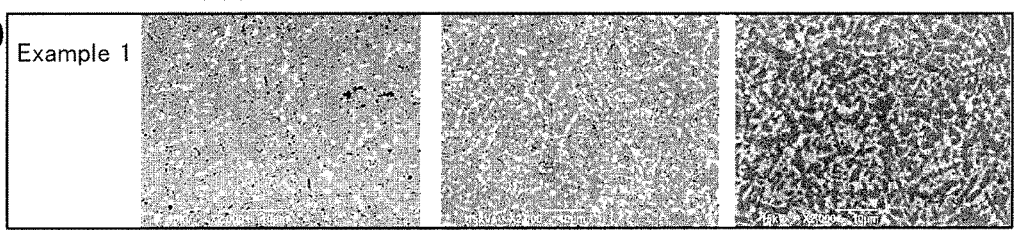

First, studies were conducted on raw materials. In FIGS. 3A to 3C, FIG. 3A shows an SEM image of a raw material powder in Experimental Example 1-3, FIG. 3B shows an SEM image of a raw material powder in Experimental Example 3-3, and FIG. 3C shows an SEM image of a raw material powder in Experimental Example 4-3. The raw material powder in Experimental Example 1-3 was spherical, and the raw material powders in Experimental Examples 3-3 and 4-3 were each a mixture of a coarse teardrop-shaped Cu powder and a fine spherical CuZr or $ZrH_2$ powder. FIG. 4 shows the results of X-ray diffraction measurement on the raw material powders in Experimental Examples 1-3, 3-3, and 4-3. The raw material powder in Experimental Example 1-3 includes a Cu phase, a $Cu_5Zr$ compound phase, and an Unknown phase. The raw material powder in Experimental Example 3-3 includes the Cu phase, a CuZr compound phase, and the $Cu_5Zr$ compound phase. The raw material powder in Experimental Example 4-3 has a multi-phase structure including the Cu phase, a $ZrH_2$ phase, and an α-Zr phase. These powders were used to produce SPS materials examined below.

Figure 6:
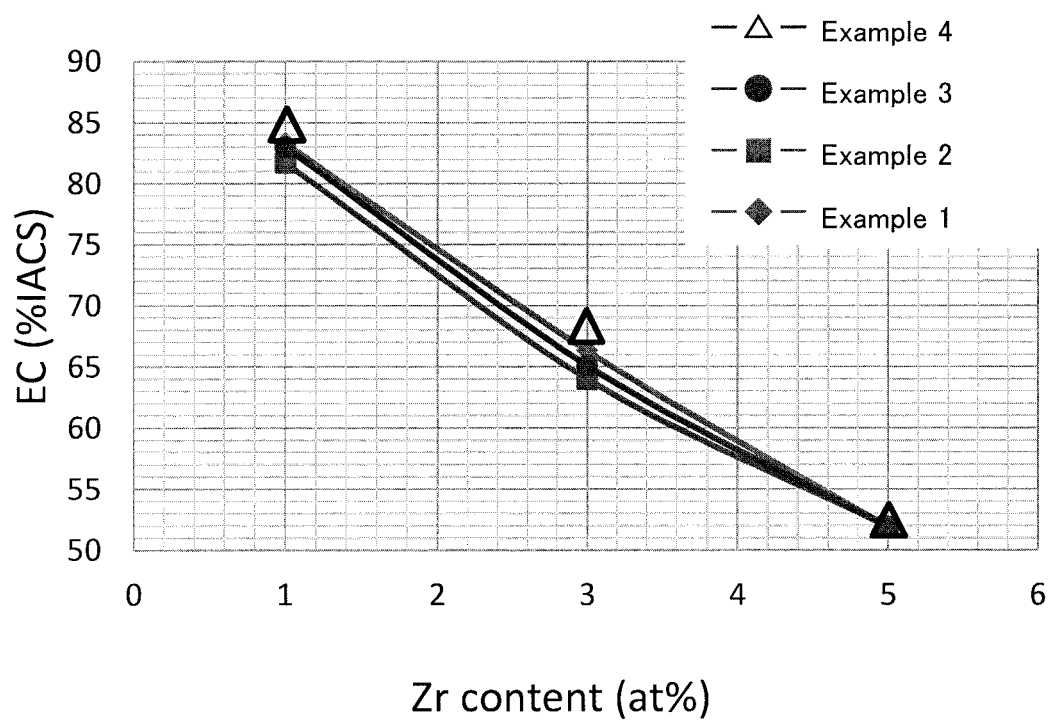
FIG. 6 shows the results of measurement of the electrical conductivity of copper alloys in Experimental Examples 1 to 4.

FIGS. 5A to 5D show SEM-BE images of cross sections in Experimental Examples 1 to 4. In the structure of each of Experimental Examples 1, crystals of two phases, i.e., the Cu and Cu—Zr-based compound (mainly $Cu_5Zr$) phases, having a size of 10 μm or less are dispersed in the cross section with no eutectic phase contained. In each of the cross sections in Experimental Examples 1, the particle size of the Cu—Zr-based compound is small, and a relatively uniform structure is obtained. In the structure of each of Experimental Examples 2 to 4, relatively large second phase domains are disposed in the α-Cu matrix phase. FIG. 6 shows the results of measurement of the electrical conductivity of the copper alloys in Experimental Examples 1 to 4. The copper alloys in Experimental Examples 1 to 4 differ in their structure as described above. However, no significant difference in the tendency of the electrical conductivity relative to the content of Zr was found between the copper alloys in Experimental Examples 1 to 4. This may be because the electrical conductivity of each of the copper alloys depends on its Cu phase and the structures of the Cu phases in the copper alloys do not differ from each other. The mechanical strength of each copper alloy may depend on the Cu—Zr-based compound phase. It is therefore inferred that, in Experimental Examples 2 to 4 also, the value of the mechanical strength is relatively high because the Cu—Zr-based compound phase is present. Experimental Examples 1-3, 3-3, and 4-3 were subjected to X-ray diffraction measurement. In Experimental Examples 1 and 3 to 4, the α-Cu phase, the $Cu_5Zr$ compound phase, and the Unknown phase were detected, and they may each have a complex structure including these phases. This shows that, even when different starting materials are used to prepare powders, the structures of the resulting SPS materials are the same. Although the X-ray diffraction intensities in the SPS materials in Experimental Examples 1-1, 1-2, 3-1, 3-2, 4-1, and 4-2 differ depending on the amount of Zr, they have the same multi-phase structure.

Next, Experimental Examples 3 were examined in detail. The average particle diameter D50 of the second phase in Experimental Example 3-3 was determined from an SEM-BE image of a cross section. The average particle diameter of the second phase was determined as follows. A backscattered electron image was observed at 100× to 500×, and the diameters of the inscribed circles of particles included in the image were determined and used as the diameters of these particles. The diameters of all the particles present in the viewing area were determined. This procedure was repeated for 5 different viewing areas. The particle diameters obtained were used to determine a cumulative distribution, and its median diameter was used as the average particle diameter D50. It was found that, in the cross sections of the copper alloys in Experimental Examples 3, the average particle diameter D50 of the second phase fell within the range of 1 μm to 100 μm. It is inferred that, in the second phase, an oxide film is formed on the outermost shell of each coarse particle. It was also found that many constricted fine particles formed twins in the core of the second phase. As can be seen from the results of elementary analysis, the second phase has an outer shell including a Cu—Zr-based compound phase containing $Cu_5Zr$ and a core including a Zr-rich Zr phase in which the content of Cu is 10 at % or less. The hardness H of the Zr phase and the hardness H of the Cu—Zr-based compound phase were measured by the nano-indentation method. As for the Young's modulus E and the hardness H, the measurement was performed at a plurality of points. After the measurement, SEM observation was performed to select measurement points pressed into the Zr phase. The measurement results were used to determine the Young's modulus E and the hardness H by the nano-indentation method. The average Young's modulus of the Zr phase was 75.4 GPa, and the average hardness H was 3.37 GPa (MHv=311 in terms of Vickers hardness). In the Cu—Zr-based compound phase, the Young's modulus E was 159.5 GPa, and the hardness H was 6.3 GPa (MHv=585 in terms of Vickers hardness). These differ from those in the Zr phase. In the conversion, MHv=0.0924×H was used (ISO 14577-1 Metallic Materials-Instrumented Indentation Test for Hardness and Materials Parameters—Part 1: Test Method, 2002).

Next, Experimental Examples 4 were examined in detail. The average particle diameter D50 of the second phase was determined from the SEM-BE image of the cross section in Experimental Example 4-3 in the same manner as described above. In the copper alloy in Experimental Example 4, the average particle diameter D50 of the second phase in the cross section was found to fall within the range of 1 μm to 100 μm. It was also found that the second phase was in the form of coarse particles each having an outer shell including a Cu—Zr-based compound phase containing $Cu_5Zr$ and a core including a Zr-rich Zr phase. It is inferred from the results of the elementary analysis that the core of the second phase is the Zr-rich Zr phase in which the amount of Cu is small and the amount of Zr is extremely large. In the SPS material in Experimental Example 4-3, the microstructure including twins was found also in the $Cu_5Zr$ compound phase.

As described above, in Experimental Examples 3 and 4, one of the Cu—Zr master alloy and $ZrH_2$ that are relatively chemically stable is used as a raw material. Even in these cases, the electrical conductivity and the mechanical strength can be improved using simple treatment, and copper alloys excellent in ablation resistance and equivalent to those in Experimental Examples 1 can be produced.

Next, examples in which electrically conductive tip members each having an inner periphery portion and an outer periphery portion were produced will be described as Examples.

Example 1

A cylindrical copper tube having an inner diameter of 10 mm was inserted into a graphite-made die having a cavity with an inner diameter of 26 mm×a height of 30 mm, and the inner circumferential side of the copper tube was filled with a total of 100 g of a Cu powder (average particle diameter: 75 μm) and a $ZrH_2$ powder such that the alloy composition was Cu-xZr (x=5.0 at %). A punch was inserted into the graphite-made die, and SPS sintering was performed using a spark plasma sintering apparatus (Model: SPS-210LX) manufactured by SPS SYNTEX INC. Specifically, while a DC pulse current of 3 kA to 4 kA was applied, the SPS sintering was performed under the conditions of a heating-up rate of 0.4 K/s, a sintering temperature of 1153K (about 0.9 Tm: Tm is the melting point of the alloy), a holding time of 15 minutes, and an applied pressure of 20 MPa, and the composite member obtained was used as Example 1.

Example 2

A cylindrical partition having a diameter of 10 mm was formed in a graphite-made die having a cavity with an inner diameter of 26 mm×a height of 30 mm. The outer circumferential side of the cylindrical partition was filled with 80 g of a Cu powder (average particle diameter: 75 μm), and the inner circumferential side was filled with 20 g of a Cu powder (average particle diameter: 75 μm) and a $ZrH_2$ powder such that the alloy composition was Cu-xZr (x=5.0 at %). Then the partition was removed. The graphite-made die was subjected to the same treatment as in Example 1, and the composite member obtained was used as Example 2.

Examples 3 to 6

The same process as in Example 2 was repeated except that the composition of the inner periphery portion, i.e., the composition of the alloy formed from the Cu powder (average particle diameter: 75 μm) and the $ZrH_2$ powder, was changed to Cu-xZr (x=8.6 at %), and the member obtained was used as Example 3. The same process as in Example 2 was repeated except that the composition of the inner periphery portion, i.e., the composition of the alloy formed from the Cu powder (average particle diameter: 75 µm) and the ZrH$_2$ powder, was changed to Cu-xZr (x=15.2 at %), and the member obtained was used as Example 4. The same process as in Example 1 was repeated except that the composition of the inner periphery portion, i.e., the composition of the alloy formed from the Cu powder (average particle diameter: 75 µm) and the ZrH$_2$ powder, was changed to Cu-xZr (x=16.7 at %), and the member obtained was used as Example 5. The same process as in Example 2 was repeated except that the composition of the inner periphery portion, i.e., the composition of the alloy formed from the Cu powder (average particle diameter: 75 µm) and the ZrH$_2$ powder, was changed to Cu-xZr (x=16.7 at %), and the member obtained was used as Example 6.

Comparative Example 1

A Cu—Be—Co-based alloy containing 1.90% by mass of Be and 0.20% by mass of Co with the balance being Cu was melted and cast, then subjected to cold rolling and solution treatment, and formed into the same shape as in Example 1, and the product was used as Comparative Example 1.

(Measurement of Electrical Conductivity and Measurement of Hardness)

The electrical conductivity of the inner periphery portion and the electrical conductivity of the outer periphery portion were measured. The hardness of Cu—Zr compound particles in the inner periphery portion and the hardness of Cu—Zr compound particles in the outer periphery portion were measured in the same manner as described above, and the hardness values in terms Vickers hardness were determined in the same manner as in the Experimental Examples described above.

(Results and Discussion)

Figure 7A:
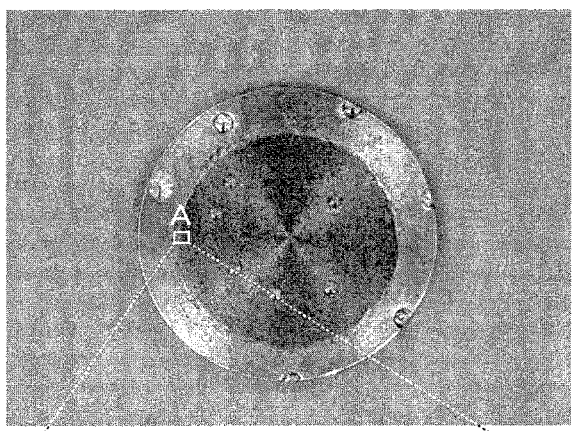
FIGS. 7A and 7B show photographs of an electrically conductive tip member in Example 1.
Figure 7A:
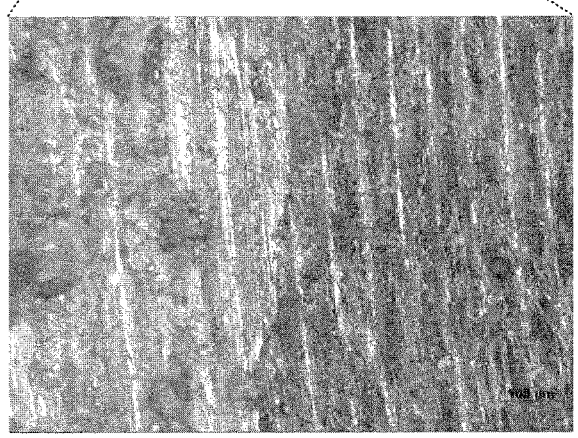
Figure 7B:
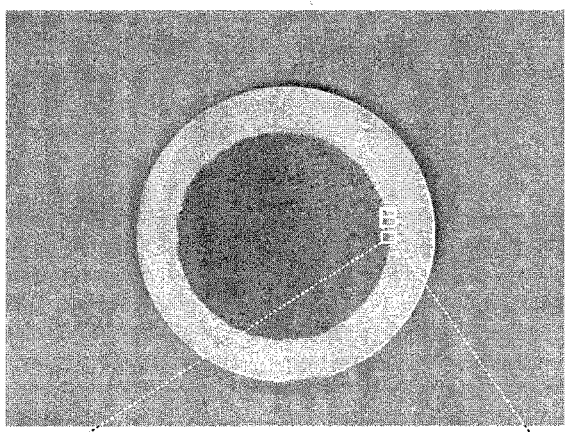
Figure 7B:
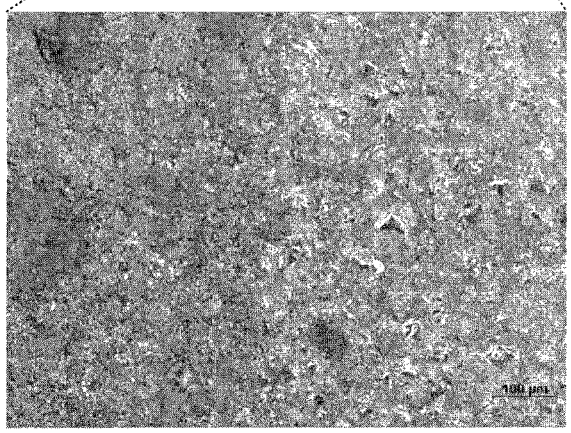
Figure 9A:
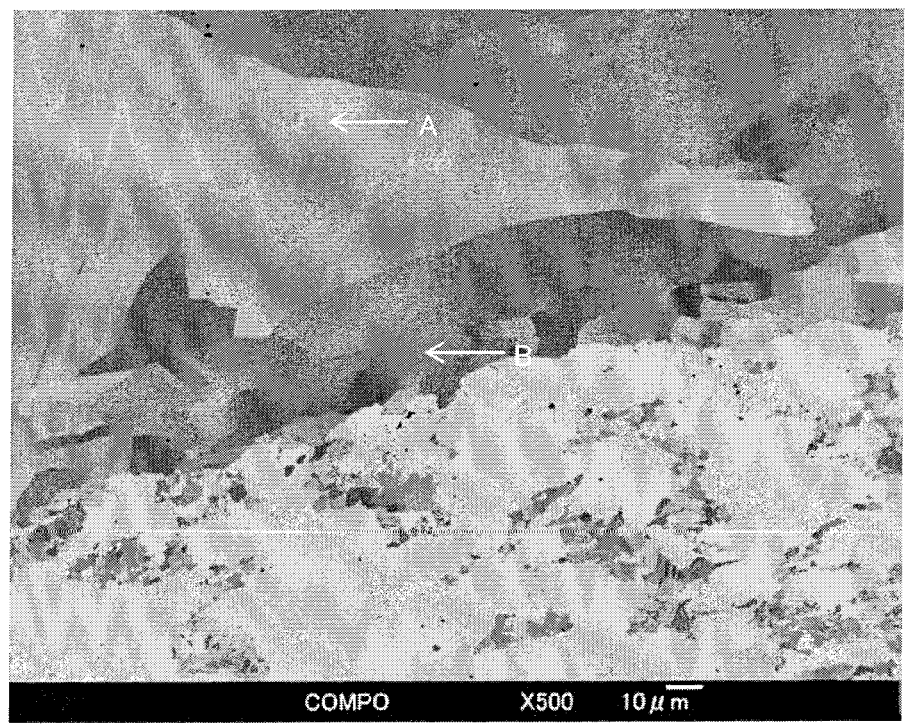
FIGS. 9A to 9F show enlarged SEM photographs of boundary portions in Example 1 and the results of elementary analysis.
Figure 9B:
Figure 9C:
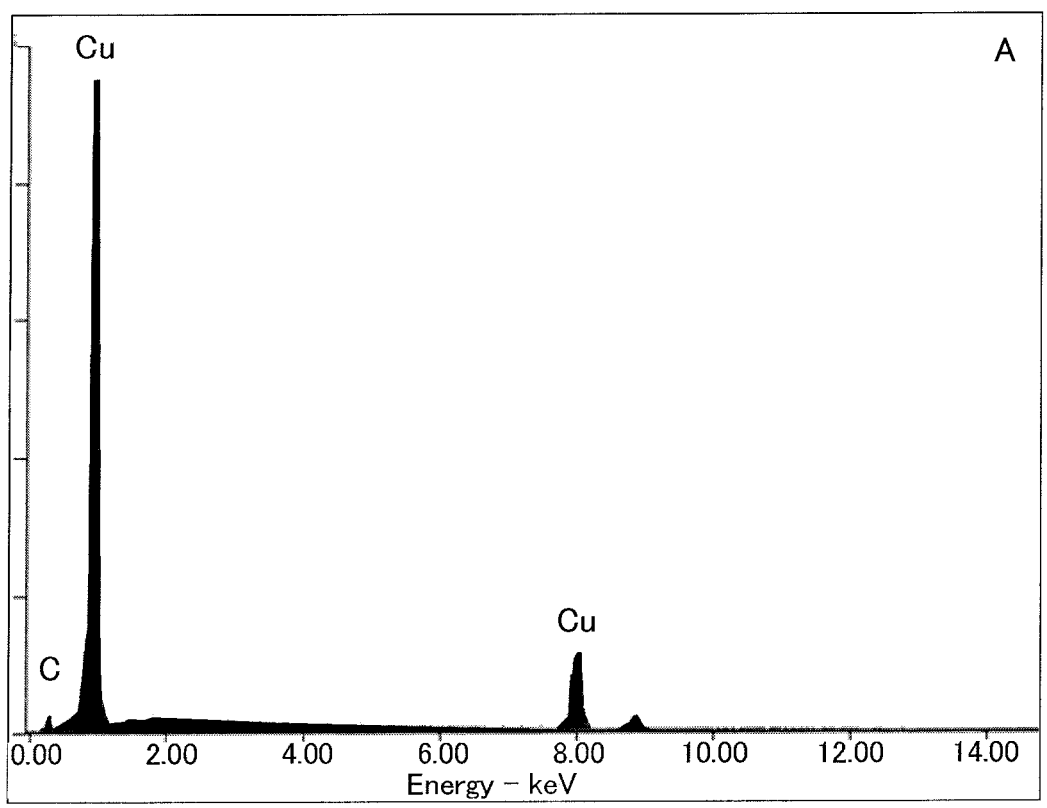
Figure 9D:
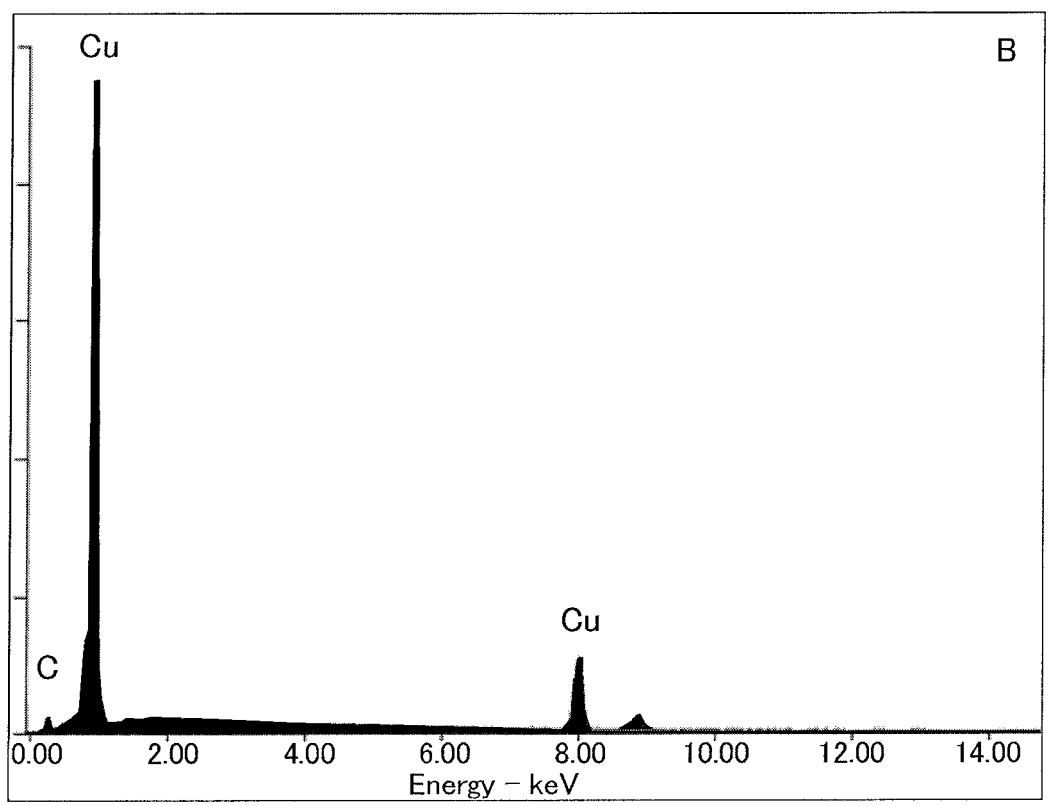
Figure 9E:
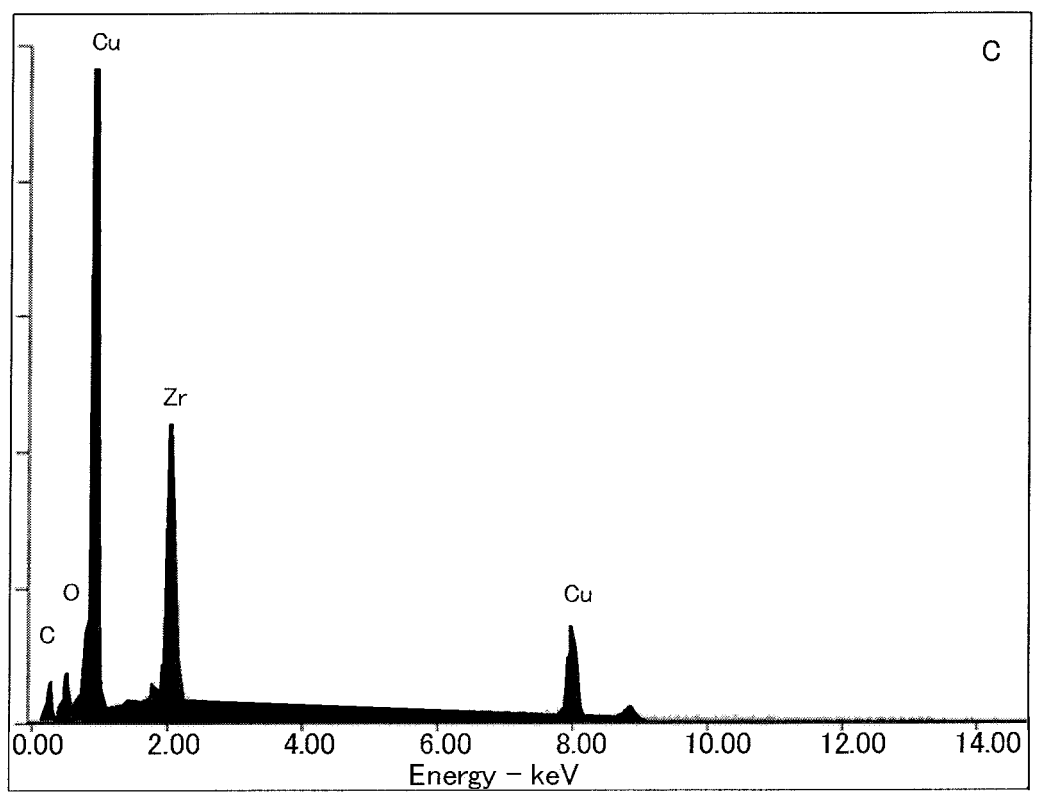
Figure 9F:
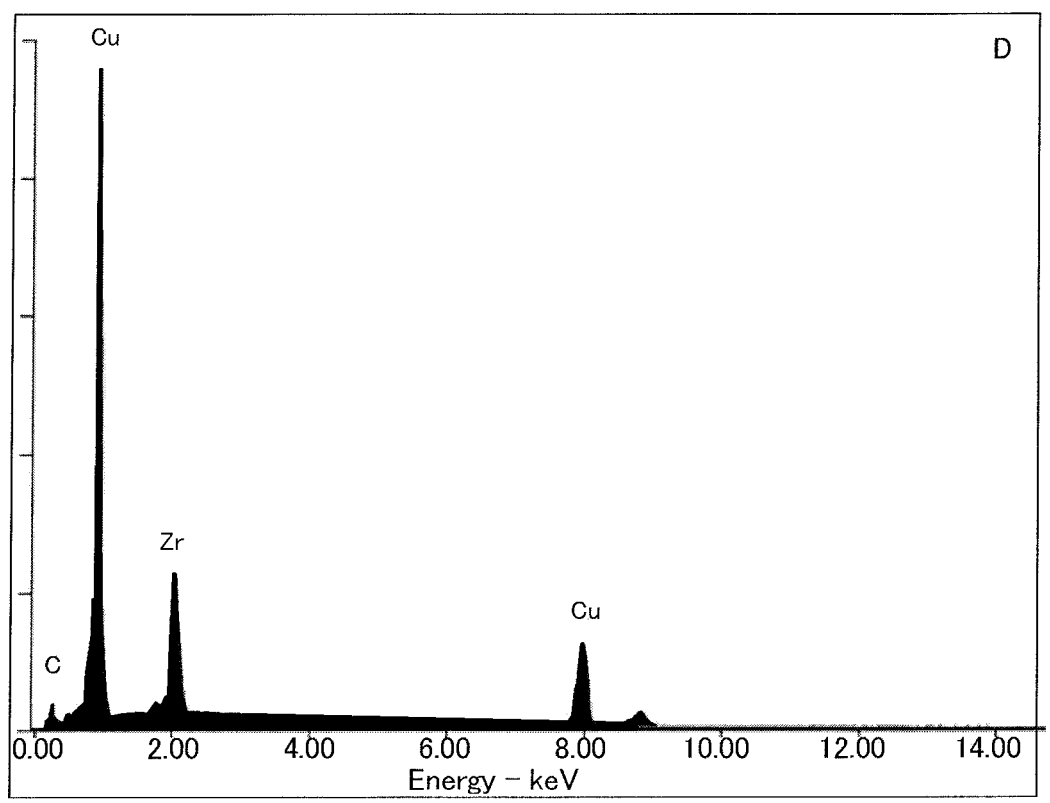
Figure 10A:
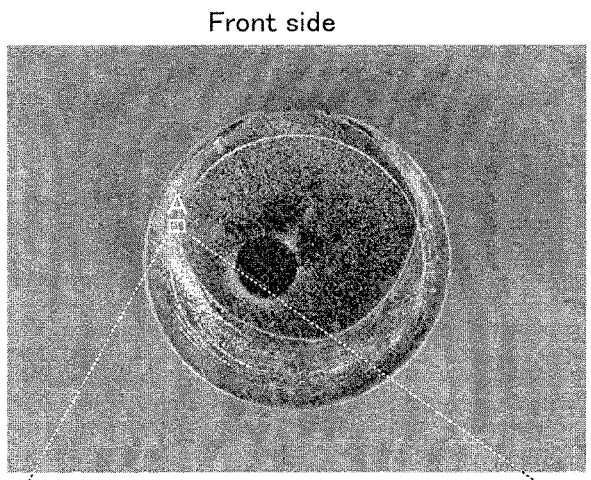
FIGS. 10A and 10B show photographs of an electrically conductive tip member in Example 2.
Figure 10B:
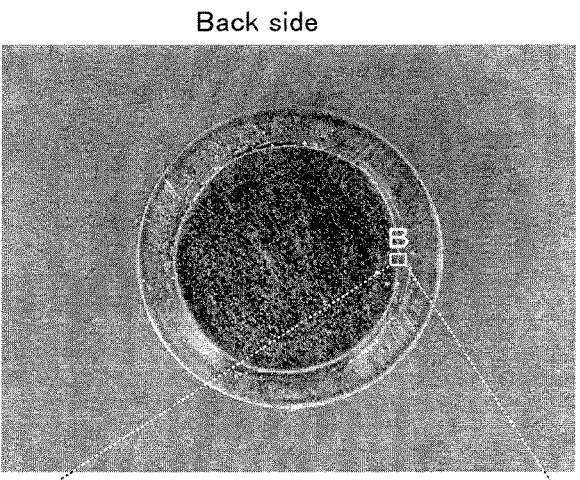
Figure 10B:
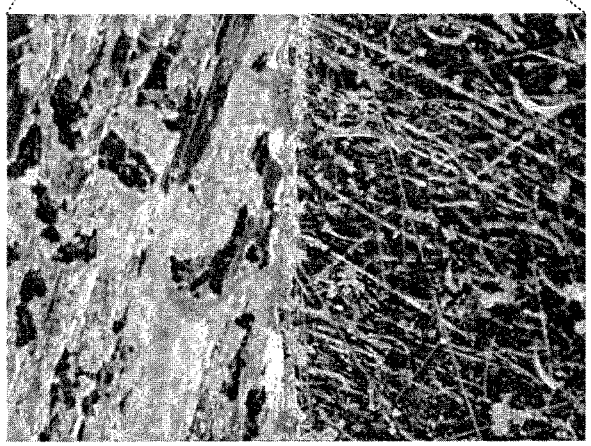
Figure 10B:
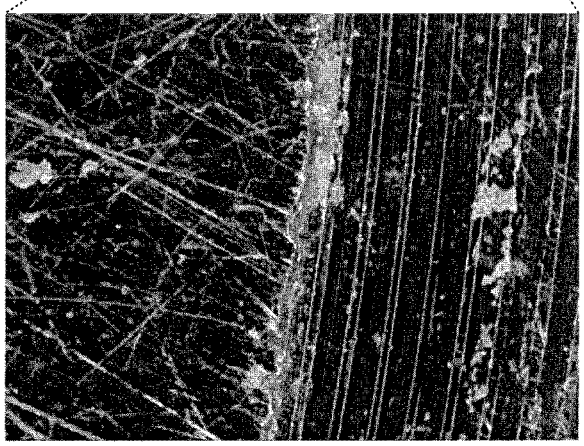
Figure 11A:
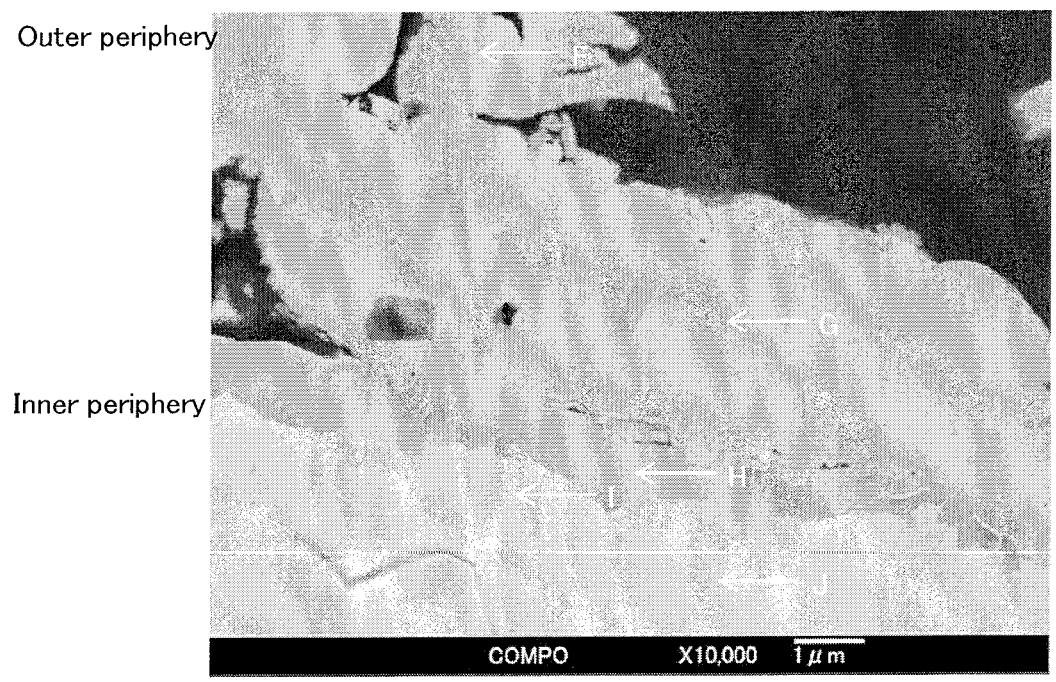
FIGS. 11A to 11F show an enlarged SEM photograph of a boundary portion in Example 2 and the results of elementary analysis.
Figure 11B:
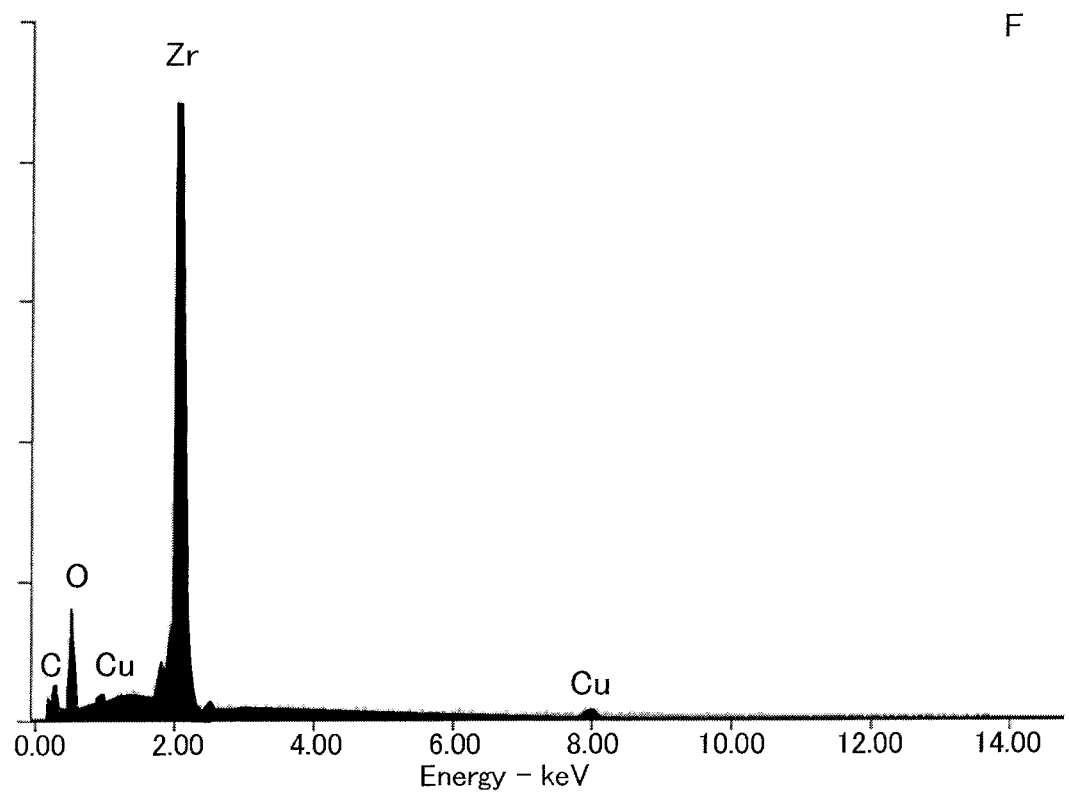
Figure 11C:
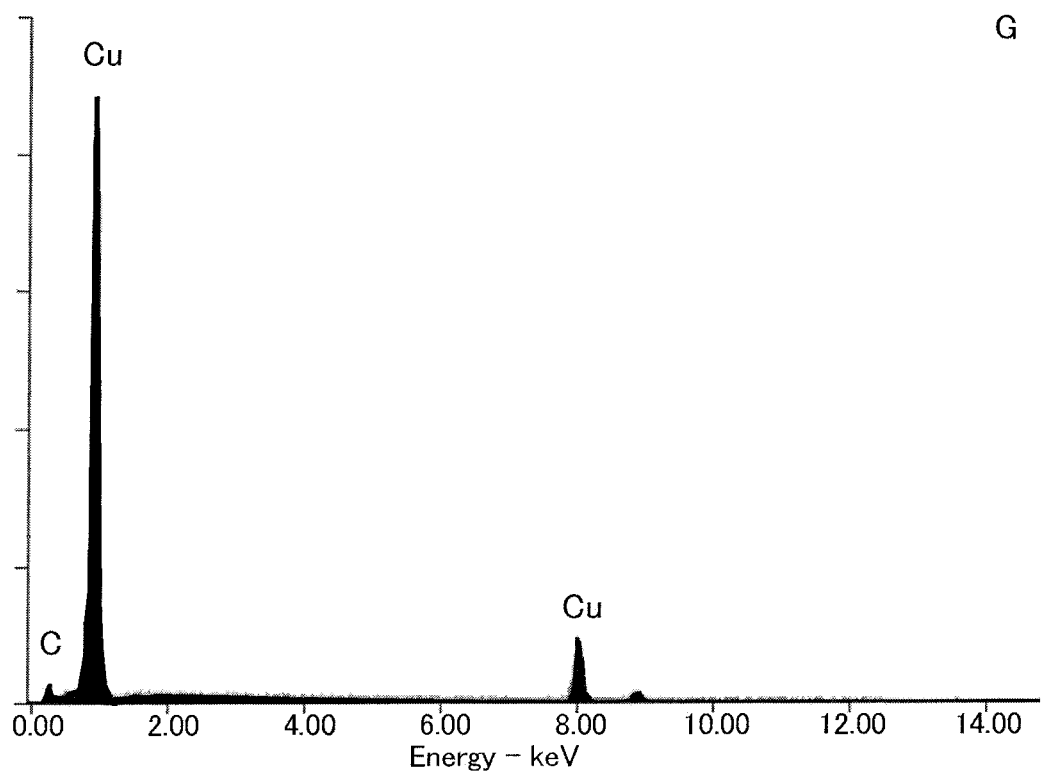
Figure 11D:
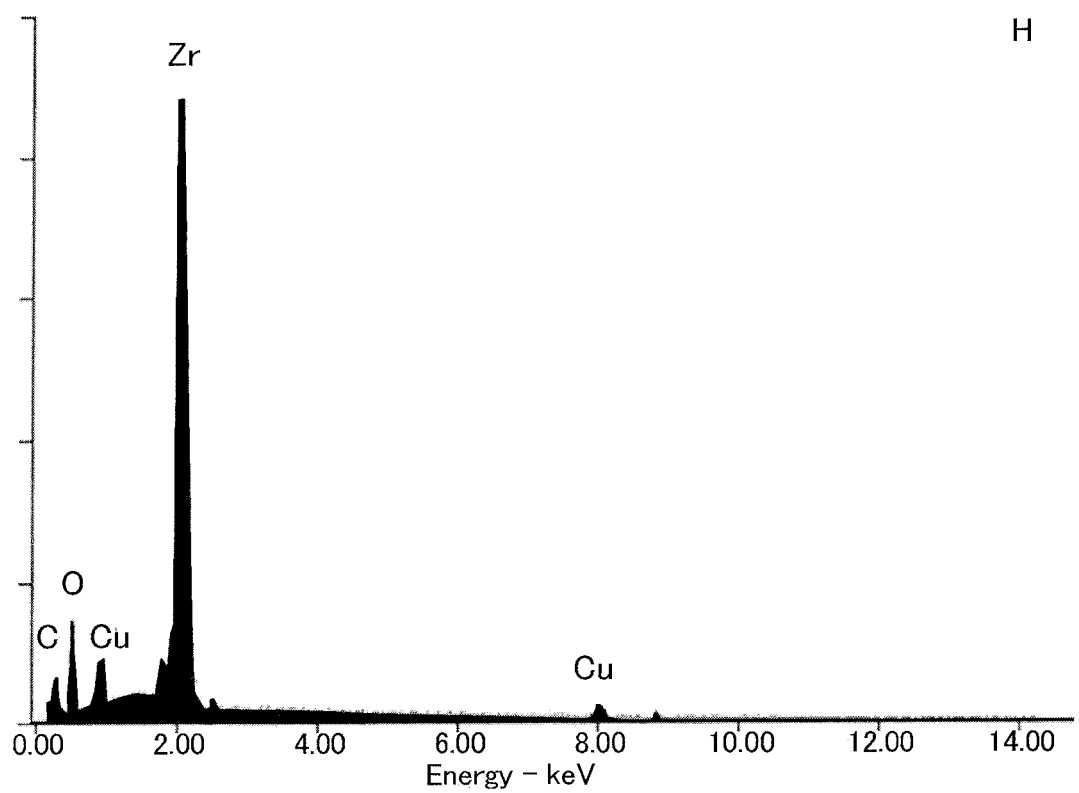
Figure 11E:
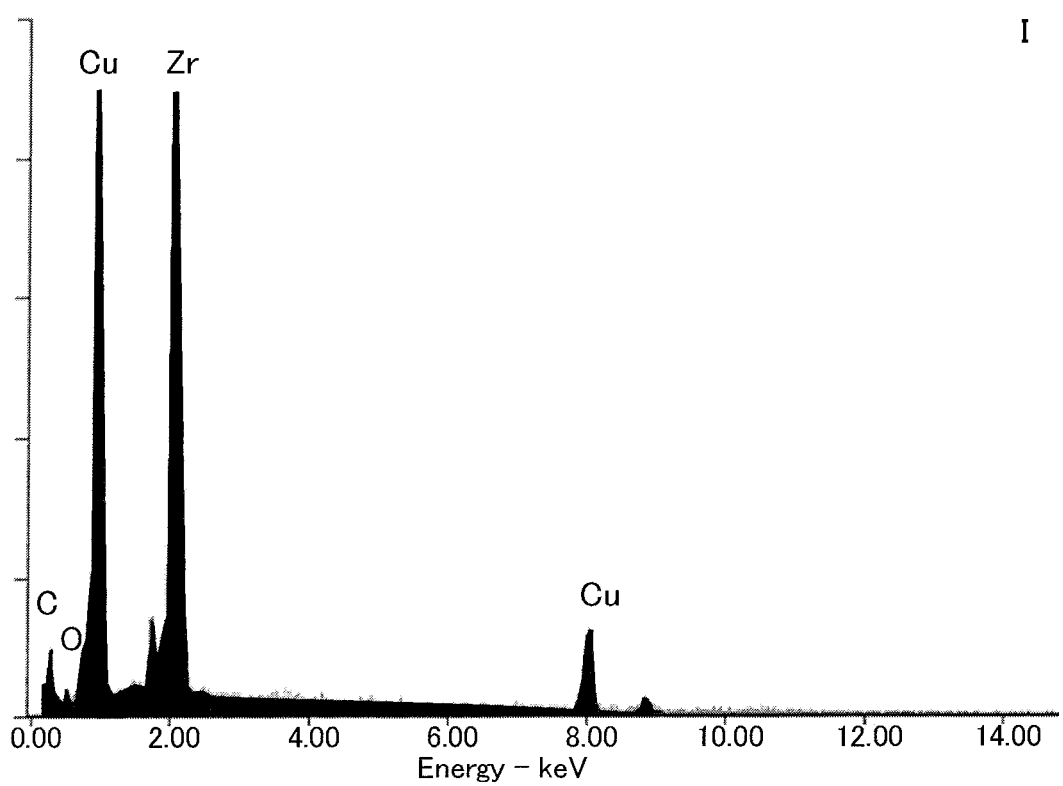
Figure 11F:
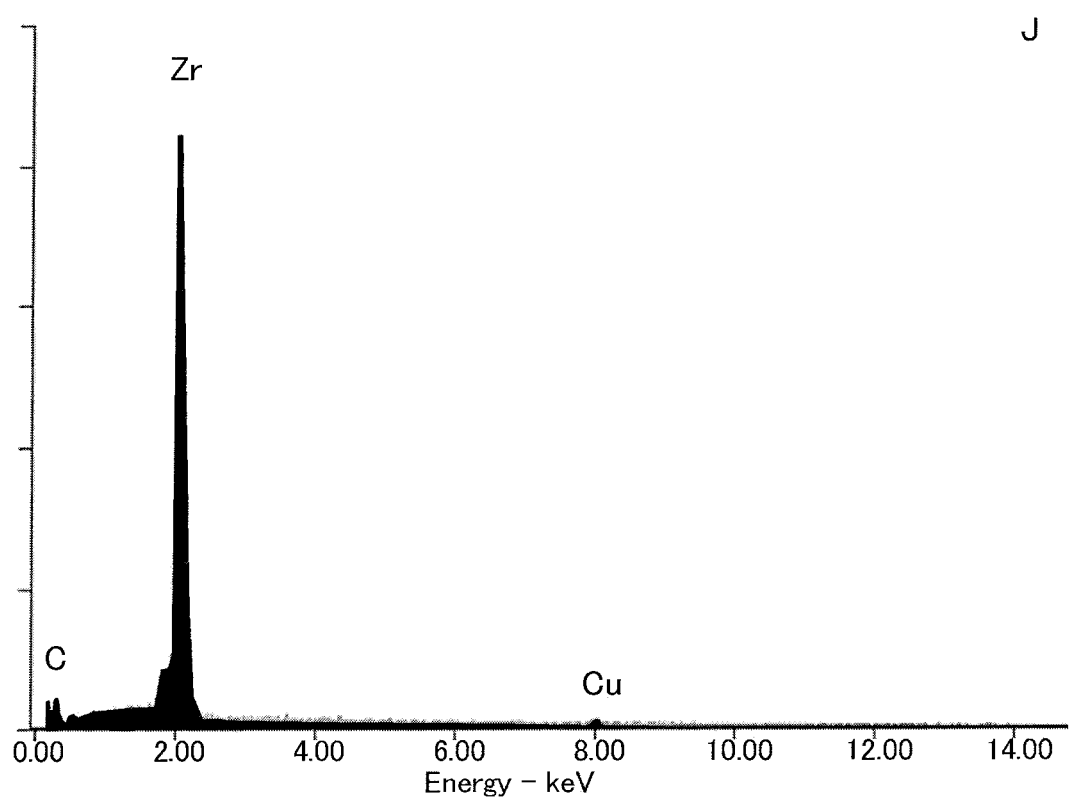

FIGS. 7A and 7B show photographs of the electrically conductive tip member in Example 1. FIG. 7A shows a photograph of the front side and an enlarged photograph, and FIG. 7B shows a photograph of the back side and an enlarged photograph. FIGS. 8A to 8D show SEM photographs of cross sections of boundary portions between the outer periphery portion and the inner periphery portion in Example 1. FIG. 8A is an SEM photograph, and FIG. 8B is an enlarged photograph of portion 1-1. FIG. 8C is an enlarged photograph of portion 1-3, and FIG. 8D is an enlarged photograph of portion 1-4. FIGS. 9A to 9F show enlarged SEM photographs of boundary portions in Example 1 and the results of elementary analysis. FIG. 9A is an enlarged SEM photograph of 1-1 in FIG. 8A, and FIG. 9B is an enlarged SEM photograph of 1-4 in FIG. 8B. FIG. 9C shows the results of the elementary analysis in portion A, and FIG. 9D shows the results of the elementary analysis in portion B. FIG. 9E shows the results of the elementary analysis in portion C, and FIG. 9F shows the results of the elementary analysis in portion D. As shown in FIGS. 7A and 7B to 9A to 9F, in Example 1, the structure of the inner periphery portion is the same as that examined in the above Experimental Examples and includes the Cu matrix phase and the second phase dispersed in the Cu matrix phase and containing the Cu—Zr-based compound. Between the inner periphery portion and the outer periphery portion, no interface such as a reaction layer having a crystal structure different from those of the inner and outer periphery portions and blocking the flow of current was found, and the inner and outer periphery portions were found to be in intimate contact through a diffusion layer.

Figure 12A:
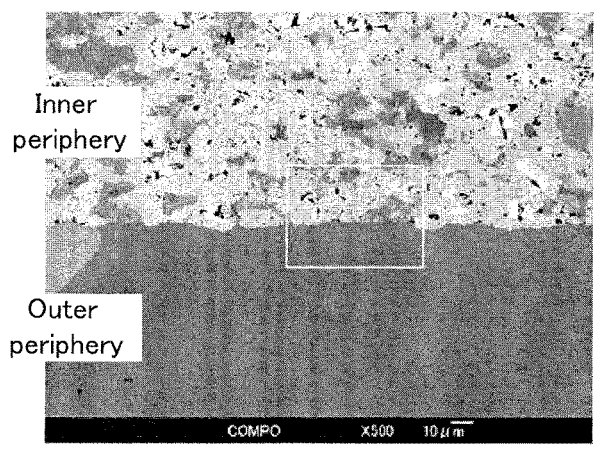
FIGS. 12A to 12D show SEM photographs of cross sections of boundary portions between an outer periphery portion and an inner periphery portion in Example 5.
Figure 12B:
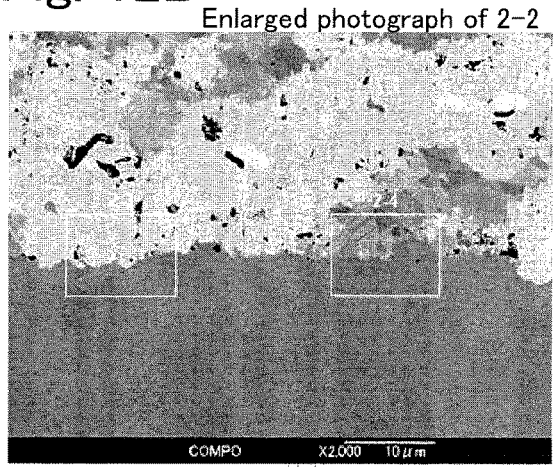
Figure 12C:
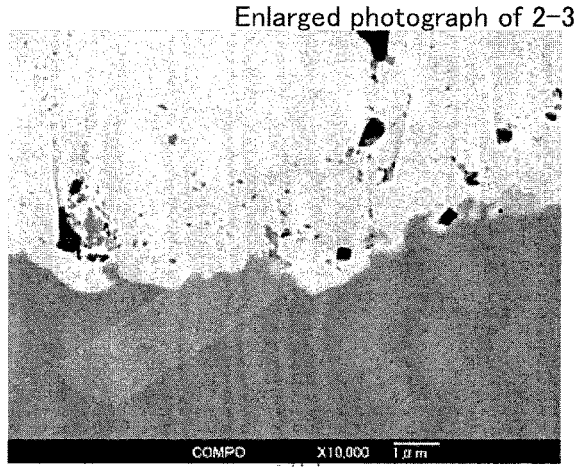
Figure 12D:
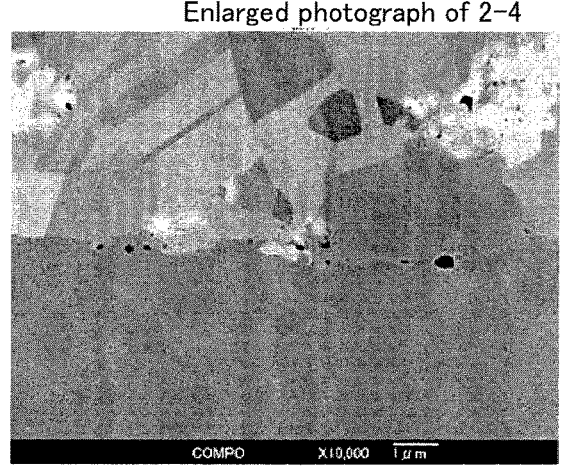
Figure 13A:
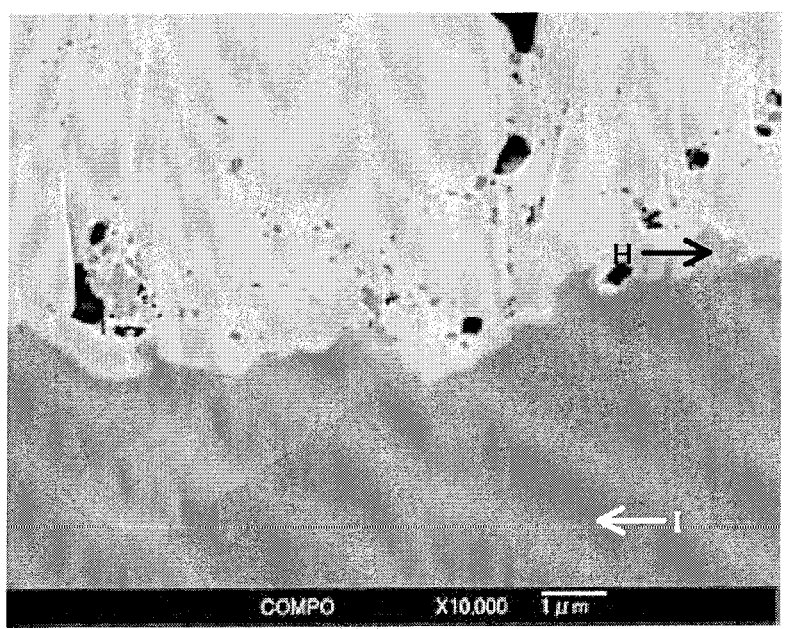
FIGS. 13A to 13C show an enlarged SEM photograph of a boundary portion in Example 5 and the results of elementary analysis.
Figure 13B:
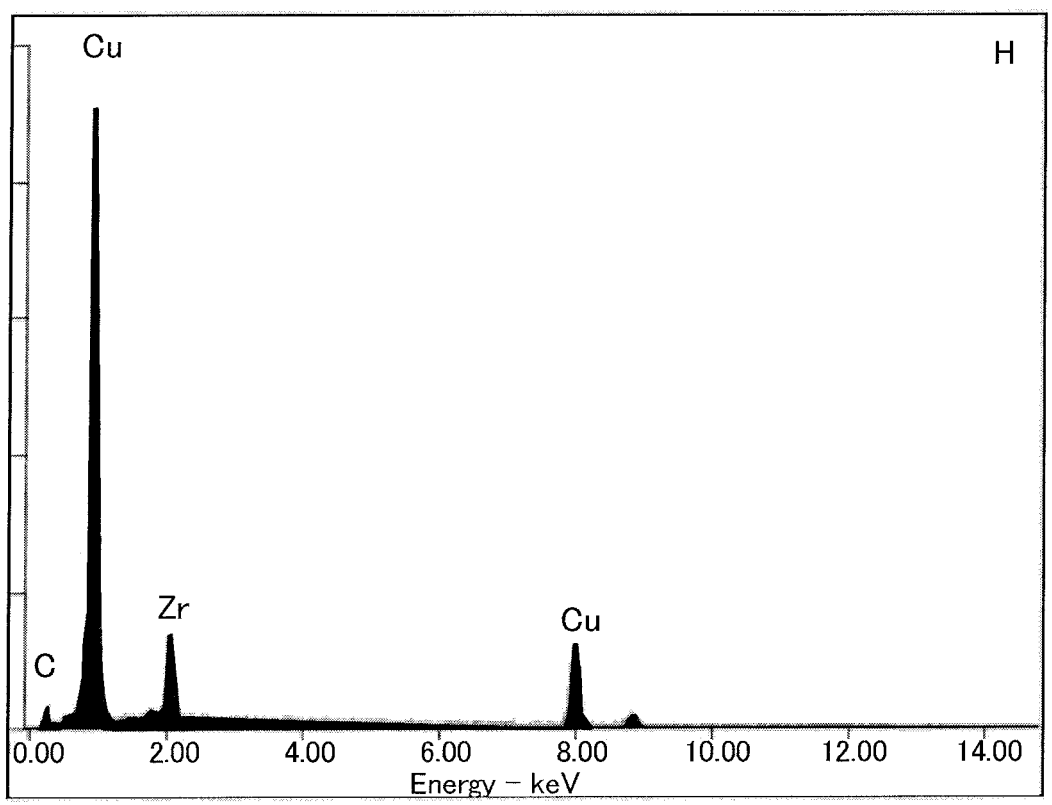
Figure 13C:
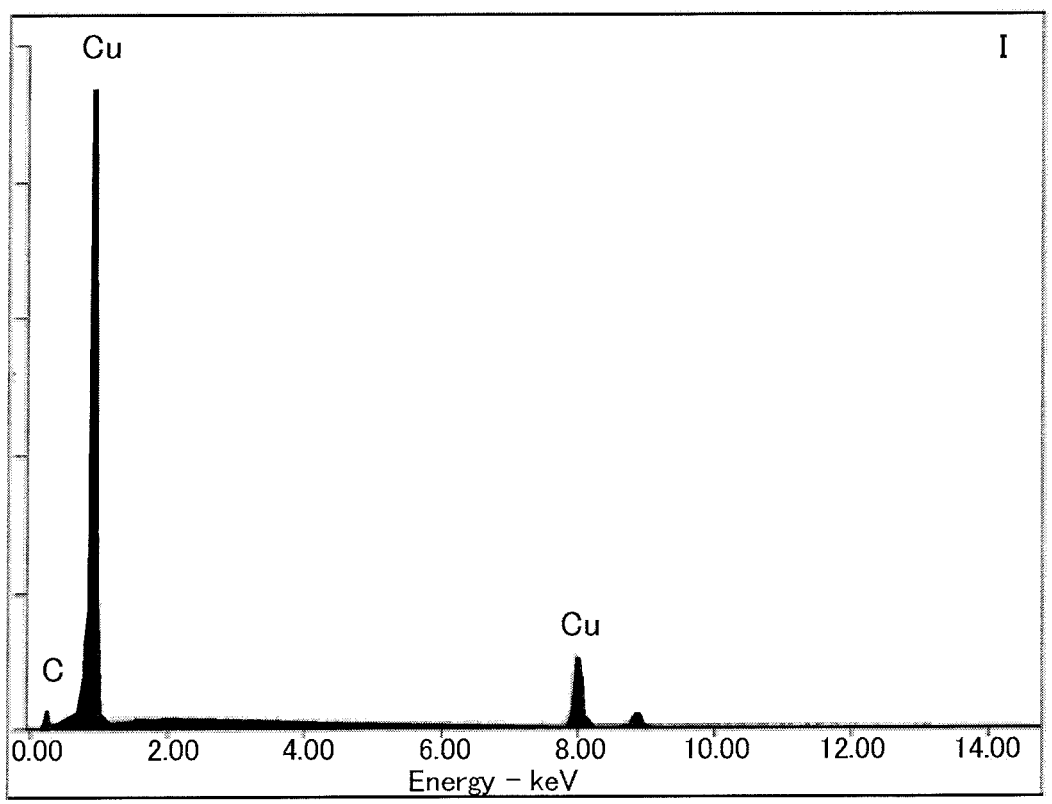

FIG. 12A to 12D show SEM photographs of cross sections of boundary portions between the outer periphery portion and the inner periphery portion in Example 5. FIG. 12A is an SEM-BE image, and FIG. 12B is an enlarged photograph of portion 2-2. FIG. 12C is an enlarged photograph of portion 2-3, and FIG. 12D is an enlarged photograph of portion 2-4. FIGS. 13A to 13C show an enlarged SEM photograph of a boundary portion in Example 5 and the results of elementary analysis. FIG. 13A is an enlarged SEM photograph of 2-3 in FIG. 12C. FIG. 13B shows the results of the elementary analysis in portion H, and FIG. 13C shows the results of the elementary analysis in portion I. As shown in FIGS. 12A to 12D and 13A to 13C, in Example 5, the structure of the inner periphery portion is the same as that examined in the above Experimental Examples and includes the Cu matrix phase and the second phase dispersed in the Cu matrix phase and containing the Cu—Zr-based compound. Between the inner periphery portion and the outer periphery portion, no interface such as a reaction layer having a crystal structure different from those of the inner and outer periphery portions and blocking the flow of current was found, and the inner and outer periphery portions were found to be in intimate contact through a diffusion layer.

Figure 14A:
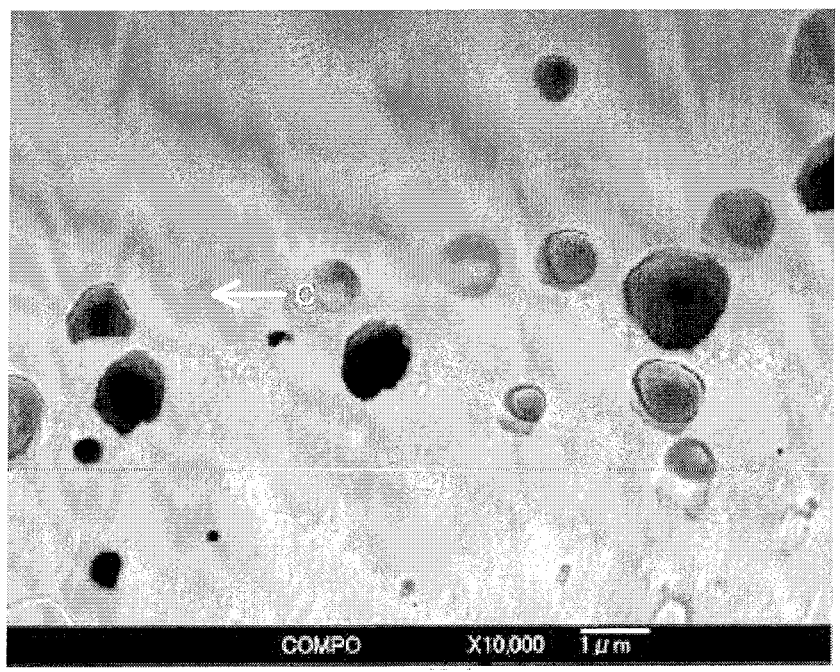
FIGS. 14A and 14B show an SEM photograph of a cross section of a boundary portion between an outer periphery portion and an inner periphery portion in Example 6.
Figure 14B:
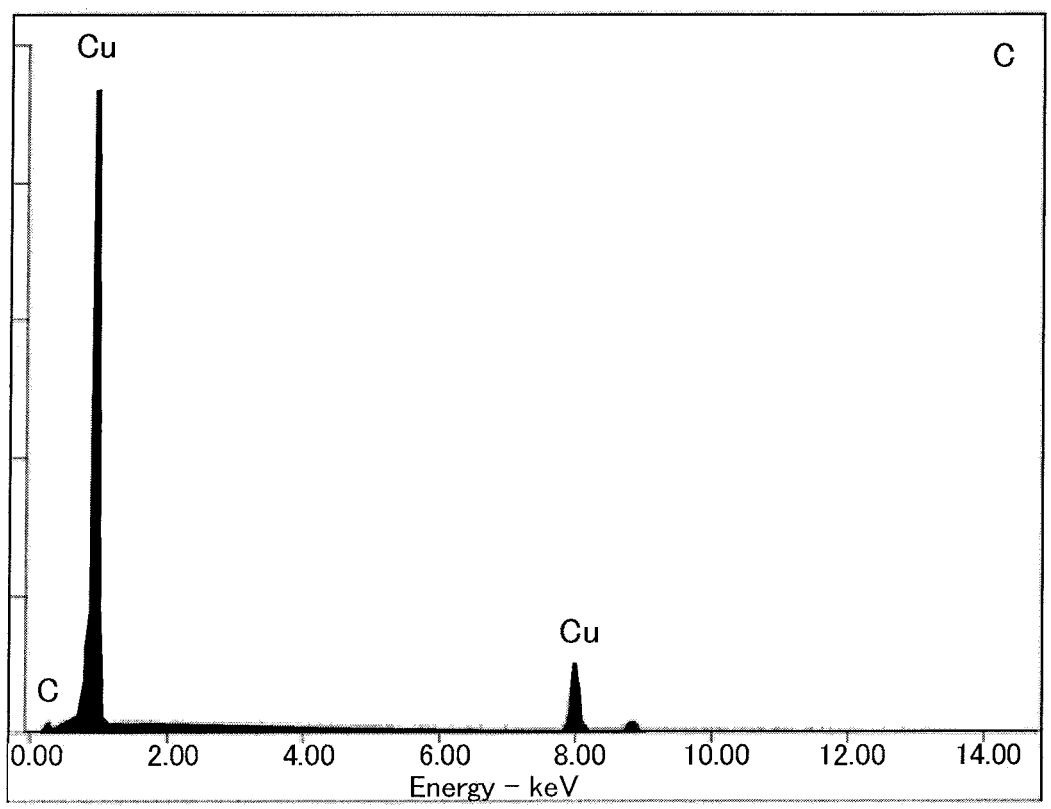
Figure 15A:
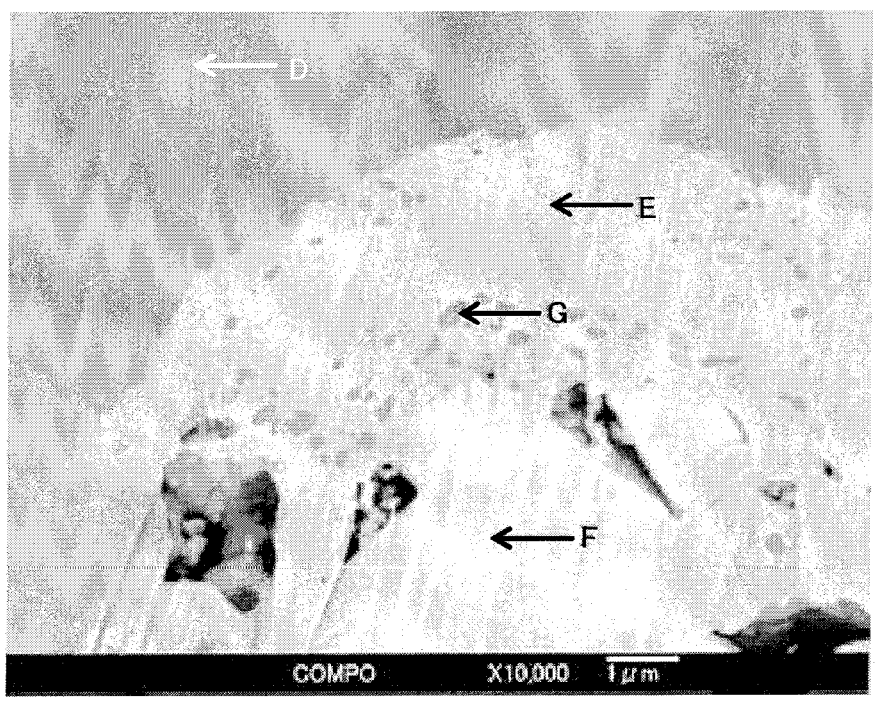
FIGS. 15A to 15E show an enlarged SEM photograph of a boundary portion in Example 6 and the results of elementary analysis.
Figure 15B:
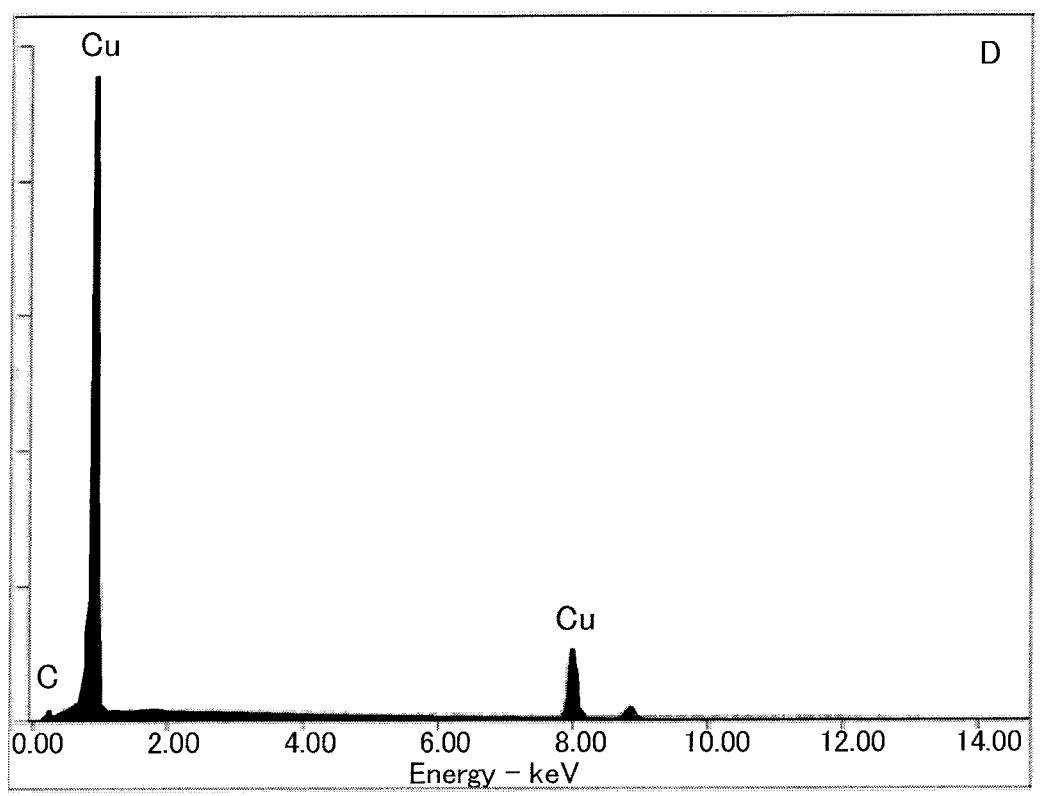
Figure 15C:
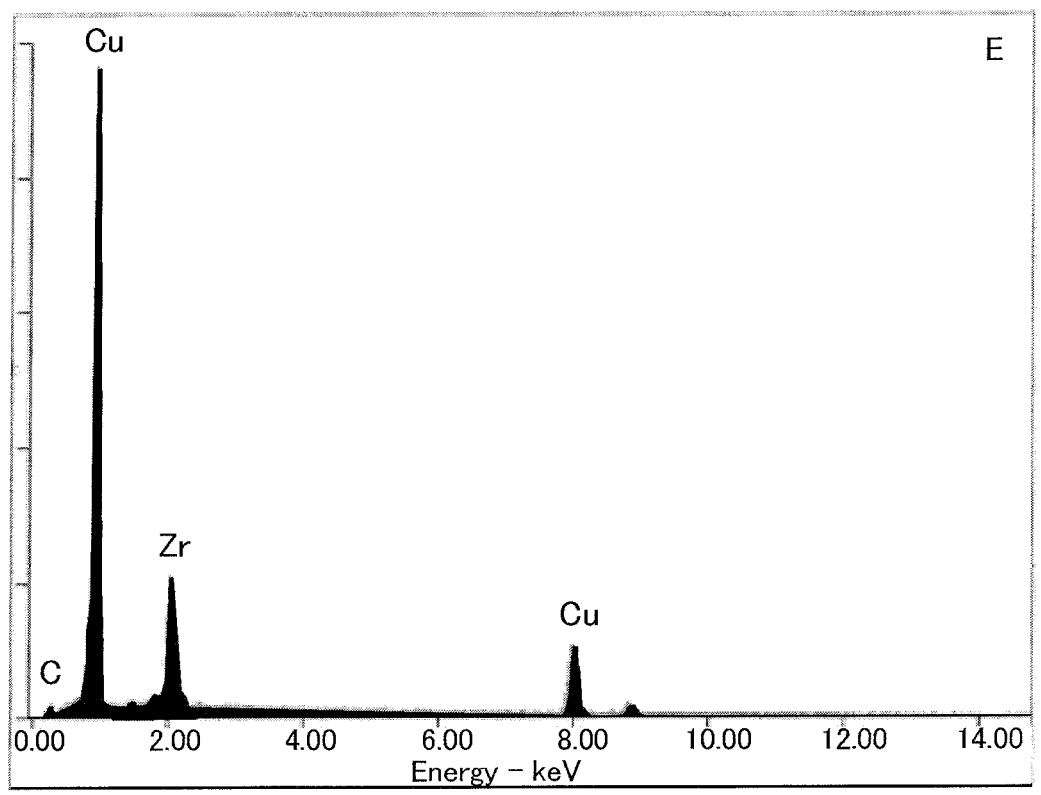
Figure 15D:
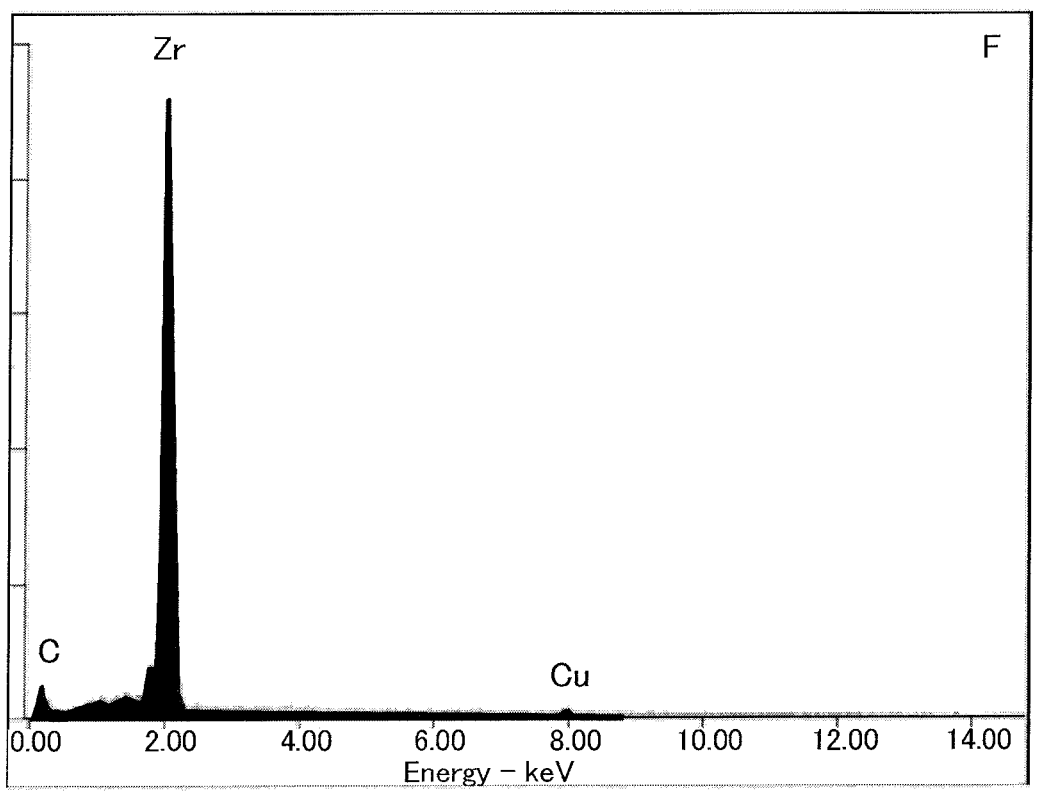
Figure 15E:
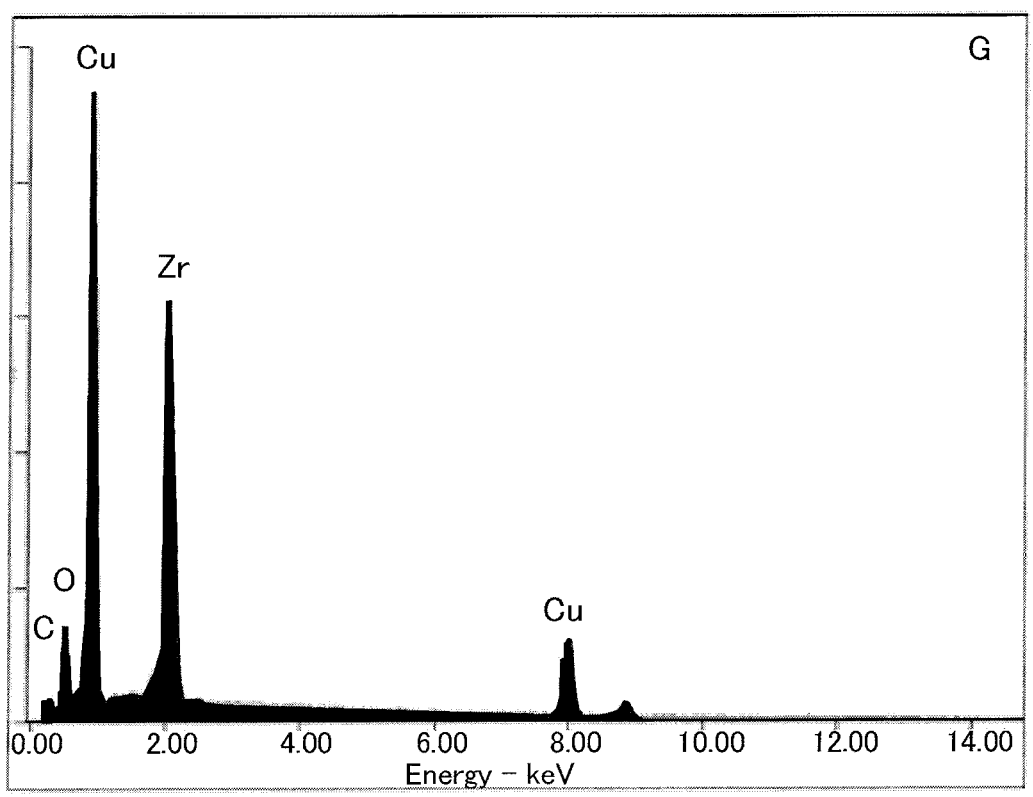

FIGS. 14A and 14B show an SEM photograph of a cross section of a boundary portion between the outer periphery portion and the inner periphery portion in Example 6. FIG. 14A is an SEM-BE image, and FIG. 14B shows the results of elementary analysis in portion C. FIGS. 15A to 15E show an SEM photograph of a cross section of a boundary portion between the outer periphery portion and the inner periphery portion in Example 6. FIG. 15A is an SEM-BE image. FIG. 15B shows the results of the elementary analysis in portion D, and FIG. 15C shows the results of the elementary analysis in portion E. FIG. 15D shows the results of the elementary analysis in portion F, and FIG. 15E shows the results of the elementary analysis in portion G. As shown in FIGS. 14A to 14B and 15A to 15E, in Example 6, the structure of the inner periphery portion is the same as that examined in the above Experimental Examples and includes the Cu matrix phase and the second phase dispersed in the Cu matrix phase and containing the Cu—Zr-based compound. Between the inner periphery portion and the outer periphery portion, no interface such as a reaction layer having a crystal structure different from those of the inner and outer periphery portions and blocking the flow of current was found, and the inner and outer periphery portions were found to be in intimate contact through a diffusion layer.

Table 2 summarizes the details of samples in Examples 2 to 5, the electrical conductivities (% IACS) of the inner and outer periphery portions, the hardness values (MHv), in terms of Vickers hardness, of the inner and outer periphery portions, and the Young's modulus (GPa) of the inner periphery portion. As shown in Table 2, the electrical conductivities of the outer periphery portions in Examples 2 to 5 were each 99% IACS, and the outer periphery portions were found to be highly electrically conductive. The electrical conductivities of the inner periphery portions in Examples 2 to 5 were 72% IACS, 61% IACS, 51% IACS, and 44% IACS, respectively, and the inner periphery portions were found to be sufficiently electrically conductive. The hardness value, in terms of Vickers hardness, of the outer periphery portion in each of Example 2 to 5 was 67 to 76 MHv. However, the hardness of the Cu—Zr-based compound phase in the inner periphery portion in each of Example 2 to 5 was high, i.e., 585 MHv or more. The Young's modulus of the Cu—Zr-based compound phase in the inner periphery portion in each of Examples 2 to 5 was high, i.e., 159.5 GPa or more. The electrical conductivity, hardness, and strength of the inner periphery portion in each of Examples 2 to 5 were found to be higher than those of the Cu—Be—Co-based alloy in Comparative Example 1. In each of Examples 2 to 5, X-ray diffraction peaks of Cu and the Cu—Zr-based compound ($Cu_5Zr$) were obtained. Moreover, the structure of the inner periphery portion is the same as that examine in the above Experimental Examples, and the inner periphery portion includes the Cu matrix phase and the second phase dispersed in the Cu matrix phase and containing the Cu—Zr-based compound.

As described above, in each of Examples 1 to 6, the inner periphery portion is a phase including the Cu matrix phase and the second phase containing the Cu—Zr compound ($Cu_5Zr$), and the outer periphery portion is the Cu phase. As the amount of Zr added increases, the amount of the bright $Cu_5Zr$ compound phase observed in the inner periphery portion increases, and the state of the inner periphery portion is changed from an non-uniform dispersed state to an uneven intimate contact state. In contrast, the amount of the Cu phase generated around the $Cu_5Zr$ compound phase decreases. At all the compositions, marks that seemed to be oxides were found, but no pores were observed, so that the inner periphery portion was found to be dense. In Example 4 also, the Cu phase was interspersed in the $Cu_5Zr$ compound phase in the inner periphery portion. No interface such as a reaction layer was found between the outer periphery portion and the inner periphery portion, and the outer and inner periphery portions were in intimate contact with each other through a diffusion layer. It is inferred that such a member is preferably used, for example, for tip electrodes attached to shanks of welding members required to have high electrical conductivity and high strength.

TABLE 2

| | Inner periphery portion | | | | Outer periphery portion | | |
|---|---|---|---|---|---|---|---|
| | Composition (Xat %) | Electrical conductivity % IACS | Vickers hardness [1] MHv | Young's modulus GPa | Composition | Electrical conductivity % IACS | Vickers hardness MHv |
| Example 2 | Cu—xZr (5.0) | 72 (51) [1] | 585 | 159.5 | Cu | 99 | 67 |
| Example 3 | Cu—xZr (8.6) | 61 (32) | 585 | 159.5 | Cu | 99 | 76 |
| Example 4 | Cu—xZr (15.2) | 51 (14) | 585 | 159.5 | Cu | 99 | 76 |
| Example 5 | Cu—xZr (16.7) | 44 (8) | 585 | 159.5 | Cu | 99 | 76 |
| Comparative example 1 | CuBeCo | 25 | 360 | 129 | — | — | — |

[1] Value of Cu—Zr compound

The present invention is not limited to the examples described above. It will be appreciated that the present invention can be embodied in various forms so long as they fall within the technical scope of the invention.

The present application claims priority based on Japanese Patent Application No. 2017-227751 filed on Nov. 28, 2017, and the entire contents of which are incorporated herein by reference.

What is claimed is:

1. A method for producing an electrically conductive tip member including an inner periphery portion and an outer periphery portion that is present on an outer circumferential side of the inner periphery portion and has higher electrical conductivity than the inner periphery portion, the method comprising a sintering step of: disposing a raw material of the outer periphery portion, which contains Cu and has a higher electrical conductivity than the inner periphery portion; disposing a raw material powder for the inner periphery portion, which has an alloy composition of Cu-xZr, where is the atomic percentage of Zr and satisfies $0.5 \leq 16.7$, obtained from a powder containing Cu and a Cu—Zr master alloy or a powder containing Cu and $ZrH_2$, on an inner circumferential side of the raw material of the outer periphery portion; pressurizing and holding the raw material powders of the outer peripheral portion and the inner peripheral portion in a prescribed pressure range at a prescribed temperature lower than the Cu—Zr eutectic point temperature of the raw material powders of the outer peripheral portion and the inner peripheral portion; and simultaneously subjecting the raw material powders of the outer peripheral portion and the inner peripheral portion to spark plasma sintering.

2. The method for producing an electrically conductive tip member according to claim 1, wherein, in the sintering step, the Cu—Zr master alloy contains 50% by mass of Cu.

3. The method for producing an electrically conductive tip member according to claim 1, wherein, in the sintering step, the raw material powders of the outer peripheral portion and the inner peripheral portion are inserted into a graphite-made die and subjected to the spark plasma sintering in a vacuum.

4. The method for producing an electrically conductive tip member according to claim 1, wherein, in the sintering step, the spark plasma sintering is performed at the prescribed temperature lower by 400° C. to 5° C. than the eutectic point temperature.

5. The method for producing an electrically conductive tip member according to claim 1, wherein, in the sintering step, the spark plasma sintering is performed in the prescribed pressure range of from 10 MPa to 60 MPa inclusive.

6. The method for producing an electrically conductive tip member according to claim 1, wherein, in the sintering step, the spark plasma sintering is performed for a holding time in the range of from 10 minutes to 100 minutes inclusive.

7. The method for producing an electrically conductive tip member according to claim 1, wherein, in the sintering step, the raw material powders of the outer peripheral portion and the inner peripheral portion are disposed such that a central region of the inner periphery portion to be formed protrudes from the outer periphery portion and then sintered.

8. The method for producing an electrically conductive tip member according to claim 1, wherein an electrically conductive tip member that is a member used for an arm portion of a welding electrode and is a tip electrode held by a shank connected to a tip holder is produced.

* * * * *